(12) United States Patent
Cai

(10) Patent No.: US 11,614,342 B2
(45) Date of Patent: Mar. 28, 2023

(54) POSITION DETECTION UNIT, LENS MODULE, AND IMAGING APPARATUS

(71) Applicant: TDK CORPORATION, Tokyo (JP)

(72) Inventor: Yongfu Cai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 56 days.

(21) Appl. No.: 17/387,622

(22) Filed: Jul. 28, 2021

(65) Prior Publication Data

US 2022/0090940 A1  Mar. 24, 2022

(30) Foreign Application Priority Data

Sep. 18, 2020  (JP) ............................. JP2020-157878

(51) Int. Cl.
  *G01D 5/14* (2006.01)
  *G01D 5/16* (2006.01)
  *G02B 7/09* (2021.01)

(52) U.S. Cl.
  CPC ............. *G01D 5/145* (2013.01); *G01D 5/16* (2013.01); *G02B 7/09* (2013.01)

(58) Field of Classification Search
  CPC ...... G01D 5/12; G01D 5/14–145; G01D 5/16; G02B 7/02; G02B 7/04; G02B 7/09
  See application file for complete search history.

(56) References Cited

U.S. PATENT DOCUMENTS

| | | | |
|---|---|---|---|
| 6,433,537 B1 | 8/2002 | Petersen | |
| 10,712,178 B2 | 7/2020 | Uchida et al. | |
| 2009/0262466 A1* | 10/2009 | Kurata | G01D 5/145 360/324 |
| 2010/0176801 A1 | 7/2010 | Aruga et al. | |
| 2010/0308805 A1* | 12/2010 | Stuve | G01D 5/145 324/207.24 |
| 2018/0274945 A1* | 9/2018 | Uchida | G01D 5/145 |

FOREIGN PATENT DOCUMENTS

| | | |
|---|---|---|
| JP | S62-035204 A | 2/1987 |
| JP | 2000-131006 A | 5/2000 |
| JP | 2007-017353 A | 1/2007 |
| JP | 2007-271608 A | 10/2007 |
| JP | 2012-247298 A | 12/2012 |
| JP | 2019-082445 A | 5/2019 |
| WO | 2018/051729 A1 | 3/2018 |

* cited by examiner

*Primary Examiner* — Huy Q Phan
*Assistant Examiner* — David B Frederiksen
(74) *Attorney, Agent, or Firm* — Oliff PLC

(57) ABSTRACT

A position detection unit includes a magnetic sensor and a first magnetic field generator. The first magnetic field generator is spaced from and opposed to the magnetic sensor in a first-axis direction, includes a first multipolar magnet, and generates a first magnetic field to be exerted on the magnetic sensor. The first multipolar magnet includes N and S poles adjacent to each other along a plane orthogonal to the first-axis direction. The magnetic sensor and the first magnetic field generator are relatively movable with respect to each other along a second-axis direction orthogonal to the first-axis direction. A center position of the magnetic sensor in a third-axis direction orthogonal to both of the first-axis direction and the second-axis direction is different from a position in the third-axis direction of an interface between the N and S poles adjacent to each other in the third-axis direction.

20 Claims, 20 Drawing Sheets

POSITION DETECTION UNIT, LENS MODULE, AND IMAGING APPARATUS

CROSS REFERENCE TO RELATED APPLICATIONS

This application claims the benefit of Japanese Priority Patent Application No. 2020-157878 filed on Sep. 18, 2020, the entire contents of which are incorporated herein by reference.

BACKGROUND

The technology relates to a position detection unit, a lens module, and an imaging apparatus that each include a magnetic sensor.

Position detection units using magnetic sensors have been proposed. The Applicant has proposed, for example, a camera module including a position detection unit. For example, reference is made to Japanese Unexamined Patent Application Publication No. 2019-082445. In the camera module, the position detection unit detects the position of a lens that moves in performing focusing. WO 2018/051729 A1 proposes a lens driving device including a position detecting magnet and a magnetism detection member. The position detecting magnet detects a movement position of a lens holding member.

SUMMARY

A position detection unit according to one embodiment of the technology includes a magnetic sensor and a first magnetic field generator. The first magnetic field generator is spaced from and opposed to the magnetic sensor in a first-axis direction, and generates a first magnetic field to be exerted on the magnetic sensor. The first magnetic field generator includes a first multipolar magnet including a plurality of N poles and a plurality of S poles. The N and S poles are adjacent to each other along a plane orthogonal to the first-axis direction. The magnetic sensor and the first magnetic field generator are relatively movable with respect to each other along a second-axis direction orthogonal to the first-axis direction. A center position of the magnetic sensor in a third-axis direction orthogonal to both of the first-axis direction and the second-axis direction is different from a position in the third-axis direction of an interface between the N and S poles adjacent to each other in the third-axis direction.

A lens module according to one embodiment of the technology includes a magnetic sensor, a first magnetic field generator, a second magnetic field generator, and a lens. The first magnetic field generator is spaced from and opposed to the magnetic sensor in a first-axis direction, and generates a first magnetic field to be exerted on the magnetic sensor. The first magnetic field generator includes a first multipolar magnet including a plurality of N poles and a plurality of S poles. The N and S poles are adjacent to each other along a plane orthogonal to the first-axis direction. The second magnetic field generator generates a second magnetic field. The first magnetic field generator and the lens are relatively movable with respect to the magnetic sensor and the second magnetic field generator along a second-axis direction orthogonal to the first-axis direction. A center position of the magnetic sensor in a third-axis direction orthogonal to both of the first-axis direction and the second-axis direction is different from a position in the third-axis direction of an interface between the N and S poles adjacent to each other in the third-axis direction.

An imaging apparatus according to one embodiment of the technology includes an imaging element and a lens module. The lens module includes a magnetic sensor, a first magnetic field generator, a second magnetic field generator, and a lens. The first magnetic field generator is spaced from and opposed to the magnetic sensor in a first-axis direction, and generates a first magnetic field to be exerted on the magnetic sensor. The first magnetic field generator includes a first multipolar magnet including a plurality of N poles and a plurality of S poles. The N and S poles are adjacent to each other along a plane orthogonal to the first-axis direction. The second magnetic field generator generates a second magnetic field. The first magnetic field generator and the lens are relatively movable with respect to the magnetic sensor and the second magnetic field generator along a second-axis direction orthogonal to the first-axis direction. A center position of the magnetic sensor in a third-axis direction orthogonal to both of the first-axis direction and the second-axis direction is different from a position in the third-axis direction of an interface between the N and S poles adjacent to each other in the third-axis direction.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
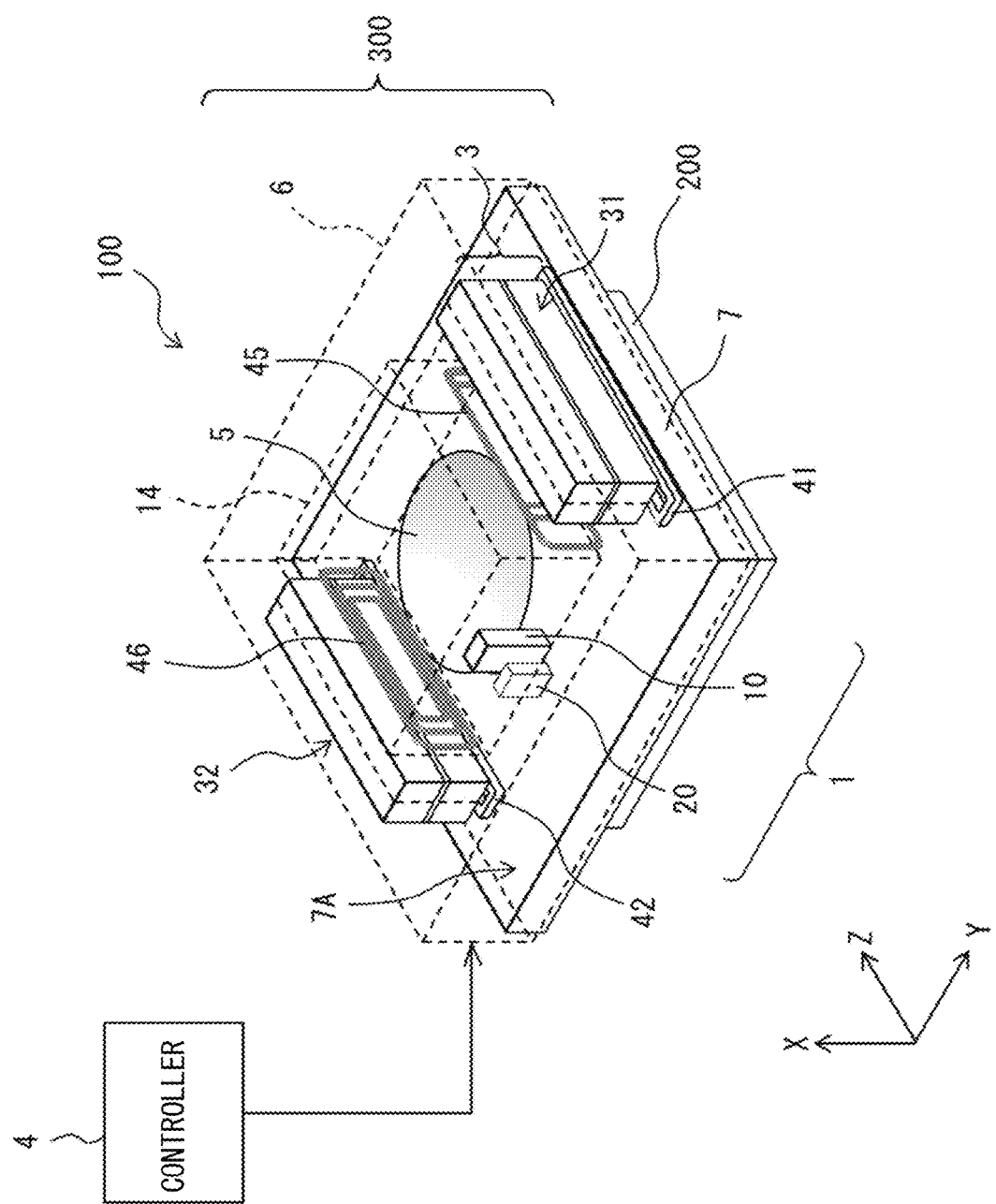
FIG. 1 is a schematic perspective diagram illustrating an overall configuration example of an imaging apparatus including a lens module that includes a position detection unit according to one example embodiment of the technology.

It is demanded that position detection units using magnetic sensors be improved in position detection accuracy.

It is desirable to provide a position detection unit, a lens module, and an imaging apparatus that achieve high detection accuracy.

In the following, some example embodiments and modification examples of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions. Note that the description is given in the following order.

1. EXAMPLE EMBODIMENT

An example of an imaging apparatus including a lens module. The lens module includes a first magnetic field generator, a second magnetic field generator, and a magnetic sensor. The first magnetic field generator generates a first magnetic field and moves along with the lens. The second magnetic field generator generates a second magnetic field for driving the lens. The magnetic sensor detects the position of the lens.

2. MODIFICATION EXAMPLES

1. Example Embodiment

[Configuration of Imaging Apparatus 100]

First, a configuration of an imaging apparatus 100 according to an example embodiment of the technology will be described with reference to FIGS. 1 to 3.

FIG. 1 is a perspective diagram illustrating an overall configuration example of the imaging apparatus 100. FIG. 2 is an explanatory diagram schematically illustrating the inside of the imaging apparatus 100 as viewed from a side direction. FIG. 3 is an explanatory diagram schematically illustrating the inside of the imaging apparatus 100 as viewed from a subject side. It is to be noted that in FIGS. 1 to 3, dimensions and locations of the components of the imaging apparatus 100 do not necessarily coincide with actual ones. Further, the imaging apparatus 100 illustrated in FIGS. 1 to 3 is merely exemplary. In any embodiment of the technology, the components of the imaging apparatus 100, and their dimensions, shapes, and locations are not limited to those illustrated in FIGS. 1 to 3.

The imaging apparatus 100 may constitute, for example, a portion of a camera for a smartphone having an optical image stabilization mechanism and an autofocus mechanism. The imaging apparatus 100 includes an image sensor 200 as an imaging element, and a lens module 300, for example. The image sensor 200 may acquire an image by using a complementary metal-oxide semiconductor (CMOS) or the like. The lens module 300 may guide light from a subject to the image sensor 200.

[Configuration of Lens Module 300]

The lens module 300 may include a position detection unit 1 according to an example embodiment of the technology, and a drive unit 3, a lens 5, a housing 6, and a substrate 7. The position detection unit 1 may be a magnetic position detection unit, and may be a mechanism that detects the position of the lens 5 in performing automatic focusing on light entering from the subject (hereinafter, simply "entering light") to allow the entering light to form an image on an imaging plane of the image sensor 200. The drive unit 3 may be a mechanism that moves the lens 5 to perform the focusing on the entering light. The housing 6 may accommodate and protect the components including the position detection unit 1 and the drive unit 3. The substrate 7 may have a top surface 7A. Note that FIG. 2 omits the illustration of the housing 6.

Figure 2:
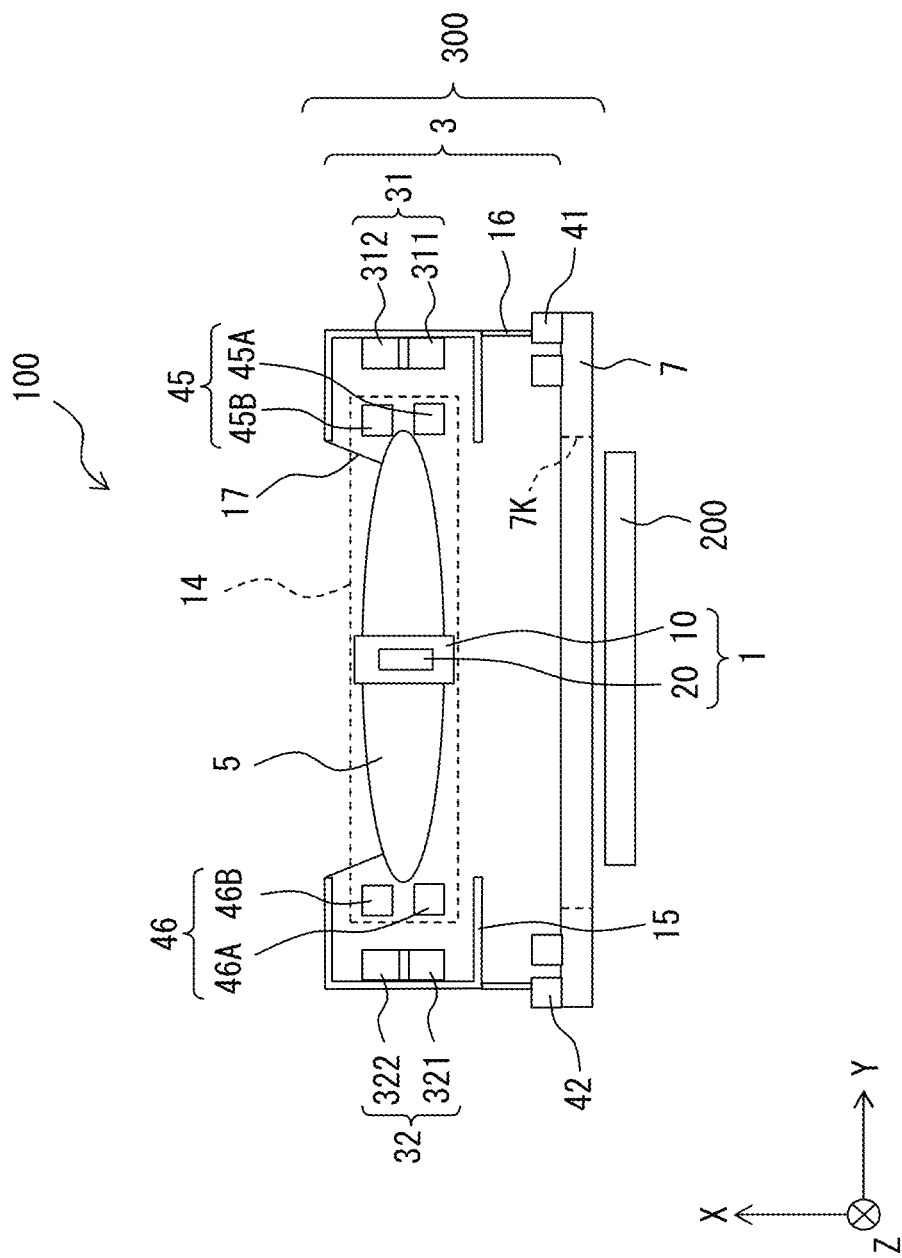
FIG. 2 is a schematic side view of the inside of the imaging apparatus illustrated in FIG. 1.
Figure 3:
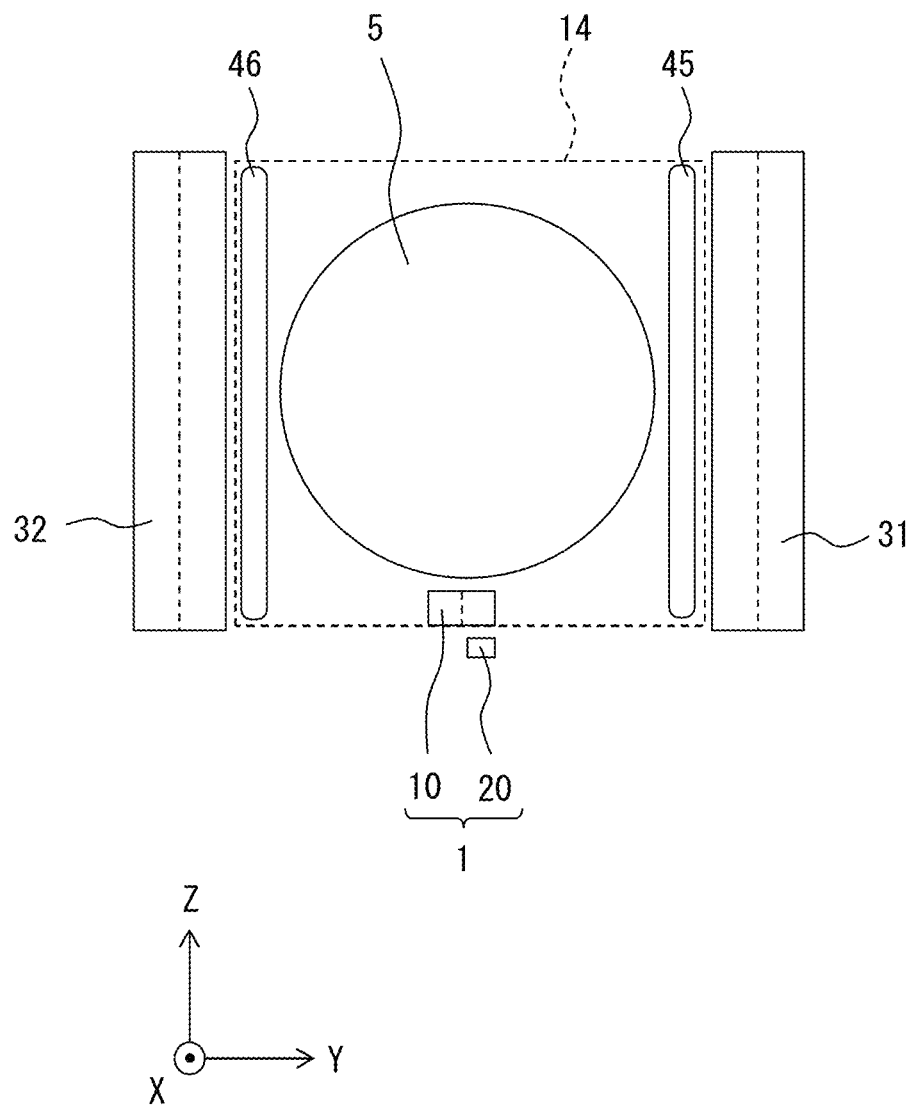
FIG. 3 is a schematic front view of the inside of the imaging apparatus illustrated in FIG. 1.

Here, an X-axis, a Y-axis, and a Z-axis are defined as illustrated in each of FIGS. 1 to 3. The X-axis, the Y-axis, and the Z-axis are orthogonal to each other. In the present example embodiment, the X-axis is perpendicular to the top surface 7A of the substrate 7, and both the Y-axis and the Z-axis are parallel to the top surface 7A of the substrate 7. Further, in the present example embodiment, a +X direction is upward, and a −X direction is downward.

Each of a +Z direction and a −Z direction, that is, a direction parallel to the Z-axis, may correspond to a specific but non-limiting example of a "first-axis direction" according to one embodiment of the technology. Each of the +X direction and the −X direction, that is, a direction parallel to the X-axis, may correspond to a specific but non-limiting example of a "second-axis direction" according to one embodiment of the technology. Each of a +Y direction and a −Y direction, that is, a direction parallel to the Y-axis, may correspond to a specific but non-limiting example of a "third-axis direction" according to one embodiment of the technology.

[Lens 5]

The lens 5 may be disposed above the top surface 7A of the substrate 7, with its optical axis coinciding with the X-axis. As illustrated in FIG. 2, the substrate 7 may have an opening 7K that allows light having passed through the lens 5 to pass therethrough. As illustrated in FIG. 2, the lens module 300 may be in alignment with the image sensor 200 to allow the light from the subject to enter the image sensor 200 after passing through the lens 5 and the opening 7K of the substrate 7 in this order.

[Position Detection Unit 1]

Next, the position detection unit 1 according to the present example embodiment will be described in detail.

The position detection unit 1 may include a first holding member 14 (see FIG. 2), a second holding member 15, a plurality of wires 16, and a plurality of springs 17. The first holding member 14 may hold a first magnet 10 to be described later and the lens 5. The first holding member 14 may have, for example, a hollow cylinder shape to allow the lens 5 to be installed therein. Note that the wires 16 and the springs 17 may be omitted from the position detection unit 1.

The first holding member 14 may be movable along a direction of the optical axis of the lens 5, that is, along an X-axis direction, with respect to the second holding member 15. In the present example embodiment, the second holding member 15 may have a box shape adapted to accommodate the lens 5 and the first holding member 14 therein. The springs 17 may couple the first holding member 14 and the second holding member 15 to each other, and may support the first holding member 14 to allow the first holding member 14 to be movable along the X-axis direction with respect to the second holding member 15.

The second holding member 15 may be provided above the top surface 7A of the substrate 7 and movable in both of a Y-axis direction and a Z-axis direction with respect to the substrate 7. The wires 16 may, while coupling the substrate 7 and the second holding member 15 to each other, support the second holding member 15 to allow the second holding member 15 to be movable in both of the Y-axis direction and the Z-axis direction with respect to the substrate 7. Upon a change in a relative position of the second holding member 15 with respect to the substrate 7, a relative position of the first holding member 14 with respect to the substrate 7 may also change.

The position detection unit 1 further includes the first magnet 10 and a magnetic sensor 20. The first magnet 10 serves as a first magnetic field generator generating a first magnetic field MF1. The first magnetic field MF1 may thus be a magnetic field that the first magnet 10 generates. The first magnetic field MF1 may include a magnetic field component Hsx along the X-axis direction and a magnetic field component Hsy along the Y-axis direction. The magnetic field component Hsx may correspond to a specific but non-limiting example of a "first magnetic field component" according to one embodiment of the technology. The magnetic field component Hsy may correspond to a specific but non-limiting example of a "second magnetic field component" according to one embodiment of the technology, and may have a phase difference from the magnetic field component Hsx. The first magnet 10 may be held by the first holding member 14 so that a relative position of the first magnet 10 with respect to second magnets 31 and 32 is changeable. The second magnets 31 and 32 may constitute a second magnetic field generator generating a second magnetic field MF2. The magnetic sensor 20 and the first magnet 10 may be relatively movable with respect to each other along the X-axis direction while keeping a state of overlapping each other in the Z-axis direction. For example, the first magnet 10 may have a substantially rectangular parallelepiped shape in appearance, with its longitudinal direction along the X-axis direction, for example. The first magnet 10 may include a first magnetic material. Examples of the first magnetic material may include a neodymium-based magnet material such as NdFeB. In some embodiments, the first magnetic material may be NdFeB of grade N48SH, for example. Alternatively, SmCo may be used as the first magnetic material. The first magnet 10 may serve as a magnet for position detection that generates the first magnetic field MF1 for use to detect the position of the first holding member 14 holding the lens 5.

The first magnet 10 may be fixed to the first holding member 14 and located between the second magnets 31 and 32 in the Y-axis direction. In other words, the first magnet 10 may be held by the first holding member 14. Upon a change in a relative position of the second holding member 15 with respect to the first holding member 14 along the X-axis direction, relative positions of the second magnets 31 and 32 with respect to the first magnet 10 may also change along the X-axis direction.

The magnetic sensor 20 may detect, as a magnetic field to be detected, a composite magnetic field MF at a predetermined detection position where the magnetic sensor 20 is disposed. Hereinafter, for the sake of convenience, the "magnetic field to be detected" will be referred to as a "detection-target magnetic field". The magnetic sensor 20 may generate a detection signal corresponding to the direction of the composite magnetic field MF. The magnetic sensor 20 may be located between the second magnet 31 and the second magnet 32 in the Y-axis direction, and may be opposed to the lens 5 in the Z-axis direction with the first magnet 10 interposed therebetween. The magnetic sensor 20 may be fixed to the second holding member 15 together with the second magnets 31 and 32. The first magnet 10 may thus be movable in the X-axis direction with respect to the magnetic sensor 20.

In the present example embodiment, the predetermined detection position may be the position where the magnetic sensor 20 is disposed. As described above, upon a change in the positions of the second magnets 31 and 32 serving as the second magnetic field generator in the X-axis direction with respect to the position of the first magnet 10 serving as the first magnetic field generator, a distance between the predetermined detection position and each of the second magnets 31 and 32 may change. The detection-target magnetic field may be the composite magnetic field MF of the first magnetic field MF1 and the second magnetic field MF2 at the detection position. The magnetic sensor 20 may be configured to generate a detection signal corresponding to the direction of the composite magnetic field MF, and to detect a positional change of the first magnet 10, that is, a positional change of the lens 5.

Figure 4A:
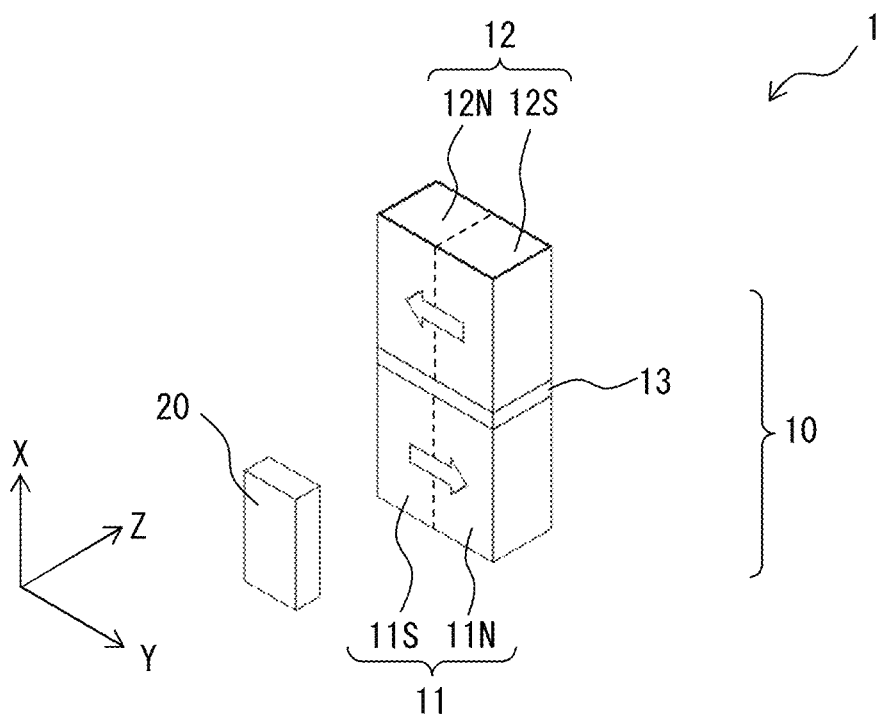
FIG. 4A is an enlarged perspective diagram illustrating a configuration example of the position detection unit illustrated in FIG. 1.
Figure 4B:
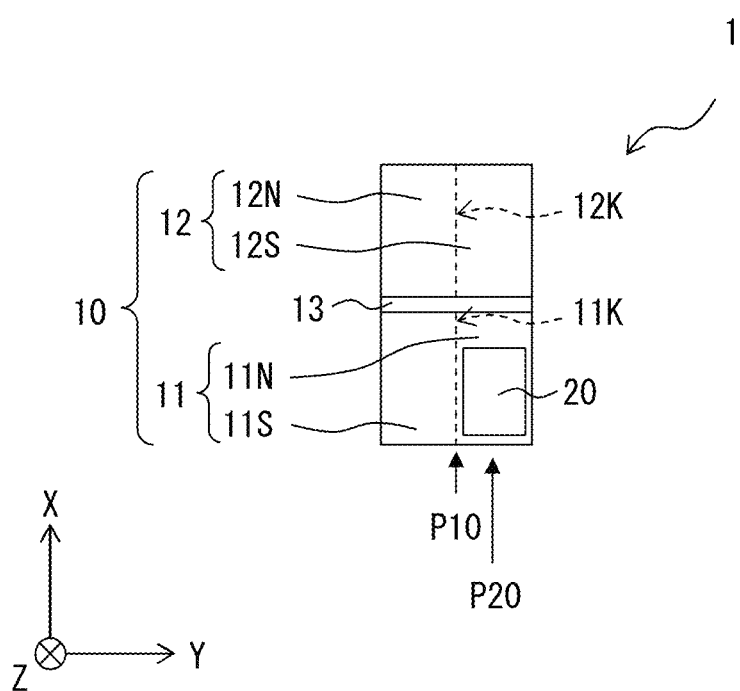
FIG. 4B is a schematic diagram for describing a positional relationship between a first magnet and a magnetic sensor illustrated in FIG. 1.

FIG. 4A is an enlarged perspective view of the first magnet 10 and the magnetic sensor 20 in the position detection unit 1. FIG. 4B is a schematic diagram illustrating an example of the magnetic sensor 20 and the first magnet 10 as viewed in the +Z direction. As described above, the first magnet 10 may be movable in the X-axis direction with respect to the magnetic sensor 20. As illustrated in FIGS. 4A and 4B, the first magnet 10 is spaced from and opposed to the magnetic sensor 20 in the Z-axis direction, for example. The first magnet 10 is a multipolar magnet including a plurality of N poles 11N and 12N and a plurality of S poles 11S and 12S. The N poles 11N and 12N and the S poles 11S and 12S are adjacent to each other along an X-Y plane orthogonal to the Z-axis direction. The first magnet 10 may include, for example, a first region part 11 magnetized in the +Y direction, a second region part 12 magnetized in the −Y direction opposite to the +Y direction, and a neutral zone 13 interposed between the first region part 11 and the second region part 12. In FIG. 4A, arrows drawn within the first region part 11 and the second region part 12 indicate the respective magnetization directions of the first region part 11 and the second region part 12. The first region part 11 and the second region part 12 may be adjacent to each other in the X-axis direction along which the first magnet 10 is movable, with the neutral zone 13 interposed between the first region part 11 and the second region part 12. The first region part 11 may include the N pole 11N and the S pole 11S adjacent to each other along the Y-axis direction. The second region part 12 may include the N pole 12N and the S pole 12S adjacent to each other in the Y-axis direction. The N pole 11N and the S pole 12S may be adjacent to each other in the X-axis direction with the neutral zone 13 interposed therebetween. The N pole 12N and the S pole 11S may be adjacent to each other in the X-axis direction with the neutral zone 13 interposed therebetween.

The neutral zone 13 may extend along the Y-axis direction, for example. The neutral zone 13 may be a non-magnetized portion, i.e., a portion that is not magnetized, of the first magnet 10.

As illustrated in FIG. 4B, an interface 11K between the N pole 11N and the S pole 11S adjacent to each other in the Y-axis direction and an interface 12K between the N pole 12N and the S pole 12S adjacent to each other in the Y-axis direction may both extend along the X-Z plane, for example. Here, a center position P20 of the magnetic sensor 20 in the Y-axis direction is different from a position P10 of the interfaces 11K and 12K in the Y-axis direction. FIG. 4B illustrates an example in which the center position P20 is offset from the position P10 in the +Y direction; however, the center position P20 may be offset from the position P10 in the −Y direction. Note that the position P10 of the interfaces 11K and 12K in the Y-axis direction may be a center position of the first magnet 10 in the Y-axis direction.

[Drive Unit 3]

Next, the drive unit 3 according to the present example embodiment will be described in detail.

The drive unit 3 may include the two second magnets 31 and 32 as the second magnetic field generator generating the second magnetic field MF2. The second magnets 31 and 32 may be disposed in a spaced apart arrangement at different positions. The second magnets 31 and 32 may be fixed to the second holding member 15. The second magnets 31 and 32 may thus be non-movable with respect to the magnetic sensor 20. The first magnet 10 serving as the first magnetic field generator may be movable along the X-axis direction with respect to the magnetic sensor 20 and the second magnets 31 and 32 serving as the second magnetic field generator.

As illustrated in FIGS. 1 to 3, the second magnet 31 may be located in the +Y direction as viewed from the lens 5. The second magnet 32 may be located in the −Y direction as viewed from the lens 5. Thus, in the drive unit 3, the two second magnets 31 and 32 may be disposed at two sides opposed to each other, respectively, among four sides defining a square or rectangular region along the top surface 7A of the substrate 7, for example.

Each of the second magnets 31 and 32 may have a substantially rectangular parallelepiped shape with its longitudinal direction along the Z-axis direction, for example. The second magnets 31 and 32 may be opposed to each other with the lens 5 interposed therebetween in the Y-axis direction orthogonal to the Z-axis direction. The second magnetic field MF2 may be a composite of respective magnetic fields generated by the second magnets 31 and 32, and may include a magnetic field component Hdx along the X-axis direction and a magnetic field component Hdy along the Y-axis direction. The second magnets 31 and 32 may each include a second magnetic material. Examples of the second magnetic material include a neodymium-based magnet material such as NdFeB. In some embodiments, the second magnetic material may be NdFeB of grade N48H, for example. The second magnets 31 and 32 may be fixed to the second holding member 15. In other words, the second magnetic field generator may be held by the second holding member 15. The second magnets 31 and 32 may each serve as a drive magnet that generates a drive force to cause the first holding member 14 holding the lens 5 to move along the Z-axis. In addition, the second magnets 31 and 32 may also serve as bias magnets to apply a bias to the magnetic sensor 20.

Figure 5A:
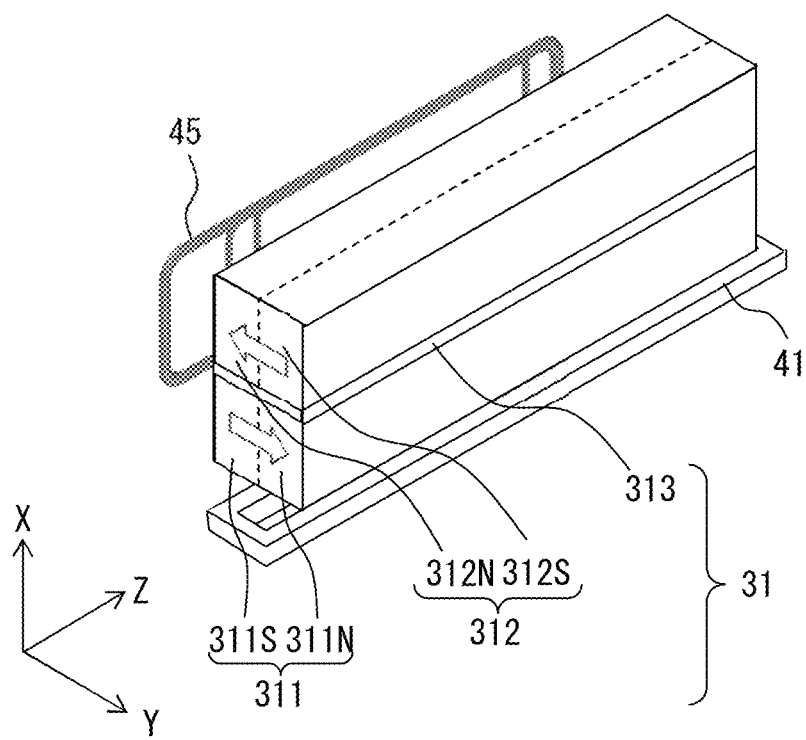
FIG. 5A is an enlarged perspective view of a portion of a drive unit illustrated in FIG. 1.
Figure 5B:
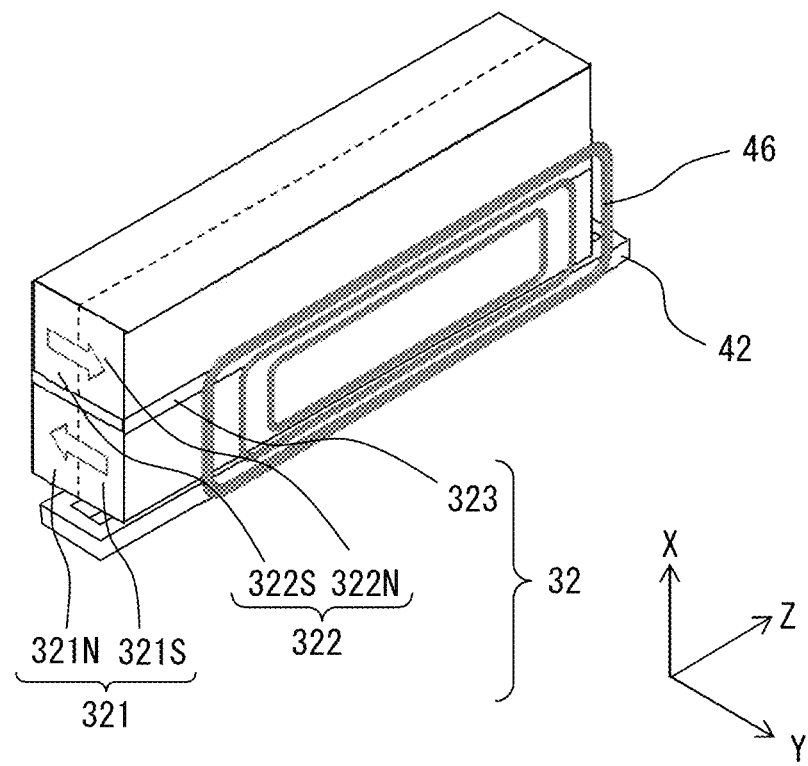
FIG. 5B is an enlarged perspective view of another portion of the drive unit illustrated in FIG. 1.

FIG. 5A is an enlarged perspective view of the second magnet 31 and the vicinity thereof in the drive unit 3. FIG. 5B is an enlarged perspective view of the second magnet 32 and the vicinity thereof in the drive unit 3. As illustrated in FIGS. 5A and 5B, the second magnet 31 and the second magnet 32 may each be a multipolar magnet, for example.

As illustrated in FIG. 5A, the second magnet 31 may include, for example, a first region part 311 magnetized in the +Y direction, a second region part 312 magnetized in the −Y direction, and a neutral zone 313 interposed between the first region part 311 and the second region part 312. In FIG. 5A, arrows drawn within the first region part 311 and the second region part 312 indicate the respective magnetization directions of the first region part 311 and the second region part 312. Each of the first region part 311 and the second region part 312 may have a substantially rectangular parallelepiped shape with its longitudinal direction along the Z-axis direction, for example. The first region part 311 and the second region part 312 may be adjacent to each other in the X-axis direction with the neutral zone 313 interposed therebetween. The first region part 311 may include an N pole 311N and an S pole 311S adjacent to each other along the Y-axis direction. The second region part 312 may include an N pole 312N and an S pole 312S adjacent to each other in the Y-axis direction. The N pole 311N and the S pole 312S may be adjacent to each other in the X-axis direction with the neutral zone 313 interposed therebetween. The N pole 312N and the S pole 311S may be adjacent to each other in the X-axis direction with the neutral zone 313 interposed therebetween.

As illustrated in FIG. 5B, the second magnet 32 may include, for example, a first region part 321 magnetized in the −Y direction, a second region part 322 magnetized in the +Y direction, and a neutral zone 323 interposed between the first region part 321 and the second region part 322. In FIG. 5B, arrows drawn within the first region part 321 and the second region part 322 indicate the respective magnetization directions of the first region part 321 and the second region part 322. Each of the first region part 321 and the second region part 322 may have a substantially rectangular parallelepiped shape with its longitudinal direction along the Z-axis direction, for example. The first region part 321 and the second region part 322 may be adjacent to each other in the X-axis direction with the neutral zone 323 interposed therebetween. The first region part 321 may include an N pole 321N and an S pole 321S adjacent to each other along the Y-axis direction. The second region part 322 may include an N pole 322N and an S pole 322S adjacent to each other in the Y-axis direction. The N pole 321N and the S pole 322S may be adjacent to each other in the X-axis direction with the neutral zone 323 interposed therebetween. The N pole 322N and the S pole 321S may be adjacent to each other in the X-axis direction with the neutral zone 323 interposed therebetween.

In addition to the second magnets 31 and 32, the drive unit 3 may further include coils 41, 42, 45, and 46.

As illustrated in FIGS. 1 and 2, the coil 41 may be disposed between the second magnet 31 and the substrate 7, and the coil 42 may be disposed between the second magnet 32 and the substrate 7. The coil 45 may be disposed between the second magnet 31 and the lens 5, and the coil 46 may be disposed between the second magnet 32 and the lens 5. The coils 41 and 42 may each be fixed to the substrate 7. The coils 45 and 46 may each be fixed to the first holding member 14.

The coil 41 may be subjected to a magnetic field occurring from the second magnet 31. The coil 42 may be subjected to a magnetic field occurring from the second magnet 32.

As illustrated in FIG. 2, the coil 45 may include a first conductor 45A extending along the first region part 311 of the second magnet 31, and a second conductor 45B extending along the second region part 312 of the second magnet 31. Further, as illustrated in FIG. 2, the coil 46 may include a first conductor 46A extending along the first region part 321 of the second magnet 32, and a second conductor 46B extending along the second region part 322 of the second magnet 32.

Figure 6A:
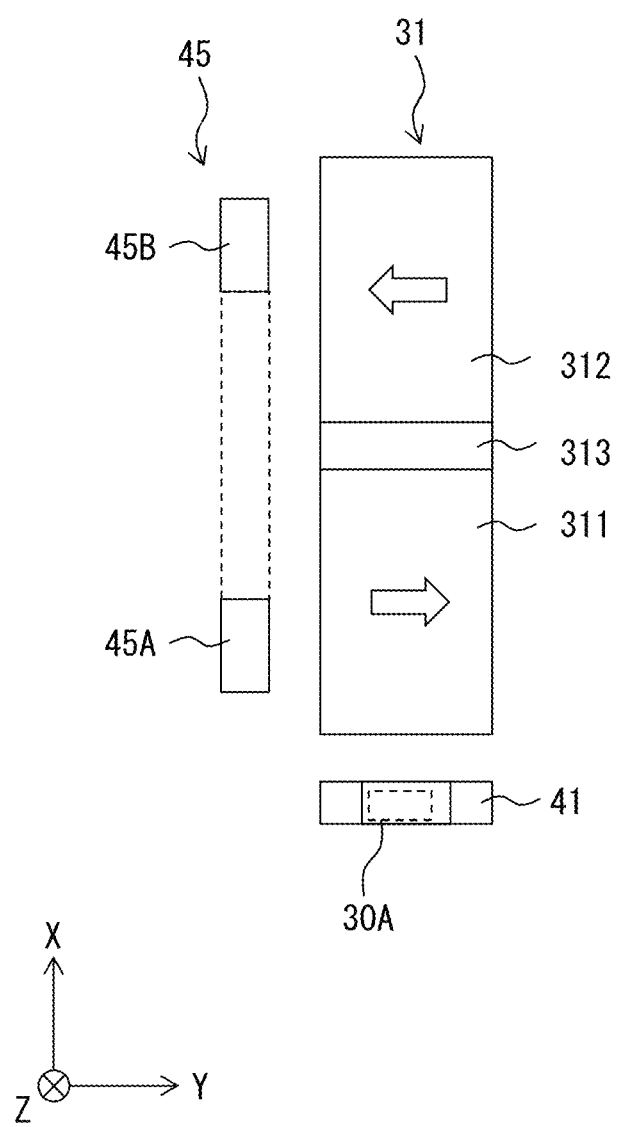
FIG. 6A is an enlarged side view of a portion of the drive unit illustrated in FIG.
Figure 6B:
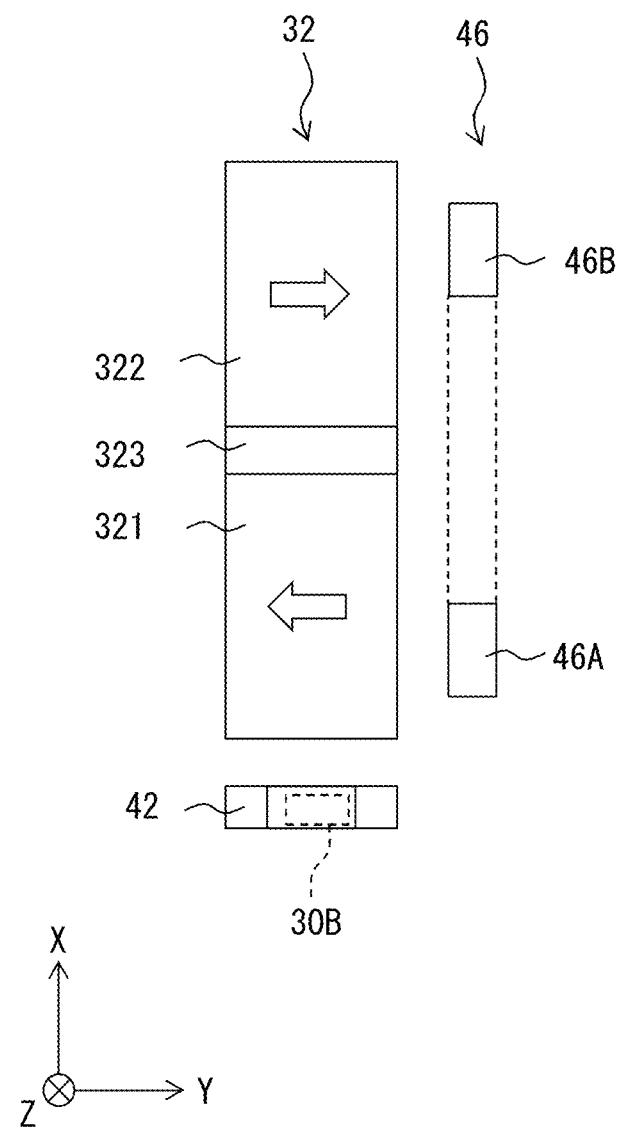
FIG. 6B is an enlarged side view of another portion of the drive unit illustrated in FIG. 1.

FIG. 6A is an enlarged side view of the second magnet 31 and the coil 45 of the drive unit 3. FIG. 6B is an enlarged side view of the second magnet 32 and the coil 46 of the drive unit 3. As illustrated in FIG. 6A, the first conductor 45A of the coil 45 may be subjected to a +Y direction component of a magnetic field occurring from the first region part 311 of the second magnet 31. The second conductor 45B of the coil 45 may be subjected to a −Y direction component of a magnetic field occurring from the second region part 312 of the second magnet 31. As illustrated in FIG. 6B, the first conductor 46A of the coil 46 may be subjected to a −Y direction component of a magnetic field occurring from the first region part 321 of the second magnet 32. The second conductor 46B of the coil 46 may be subjected to a +Y direction component of a magnetic field occurring from the second region part 322 of the second magnet 32.

As illustrated in FIGS. 6A and 6B, the drive unit 3 may further include magnetic sensors 30A and 30B. The magnetic sensors 30A and 30B may be used in changing the position of the lens 5 in order to reduce an influence of a hand-induced apparatus shake.

The magnetic sensor 30A located inside the coil 41 may detect the magnetic field occurring from the second magnet 31 and may generate a signal corresponding to the position of the second magnet 31. The magnetic sensor 30B located inside the coil 42 may detect the magnetic field occurring from the second magnet 32 and may generate a signal corresponding to the position of the second magnet 32. The magnetic sensors 30A and 30B may each include an element that detects a magnetic field, such as a magnetoresistive effect element or a Hall element. It is to be noted that the drive unit 3 may include either one of the magnetic sensor 30A located inside the coil 41 and the magnetic sensor 30B located inside the coil 42.

Figure 7:
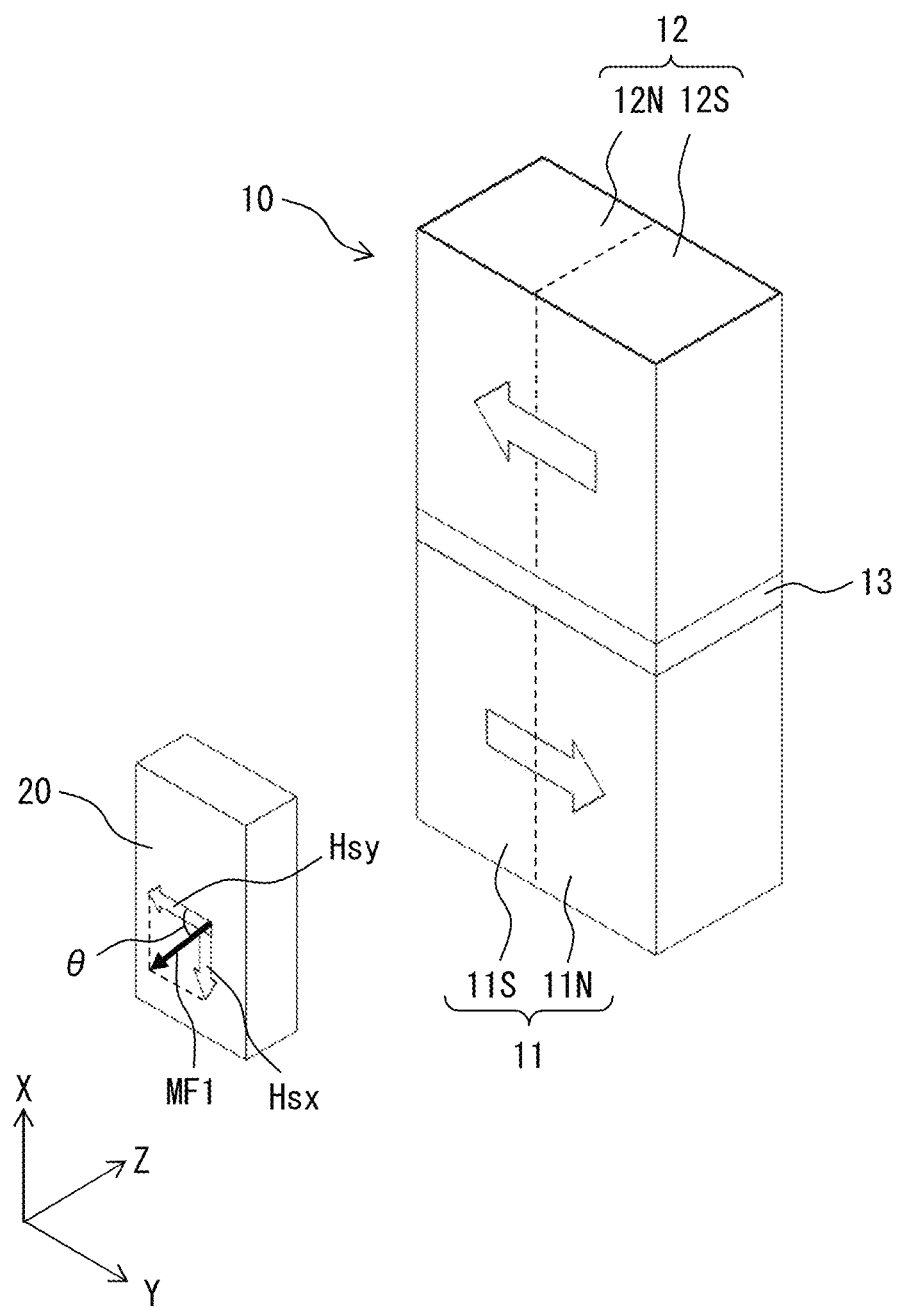
FIG. 7 is a schematic perspective view of a first magnetic field and a second magnetic field to be applied to the magnetic sensor illustrated in FIG. 1.

FIG. 7 is a perspective view of a portion of the position detection unit 1. In FIG. 7, an arrow with a reference sign MF1 represents the first magnetic field MF1 to be exerted on the magnetic sensor 20. As described above, the first magnetic field MF1 may include the magnetic field component Hsx along the X-axis direction and the magnetic field component Hsy along the Y-axis direction.

Figure 8:
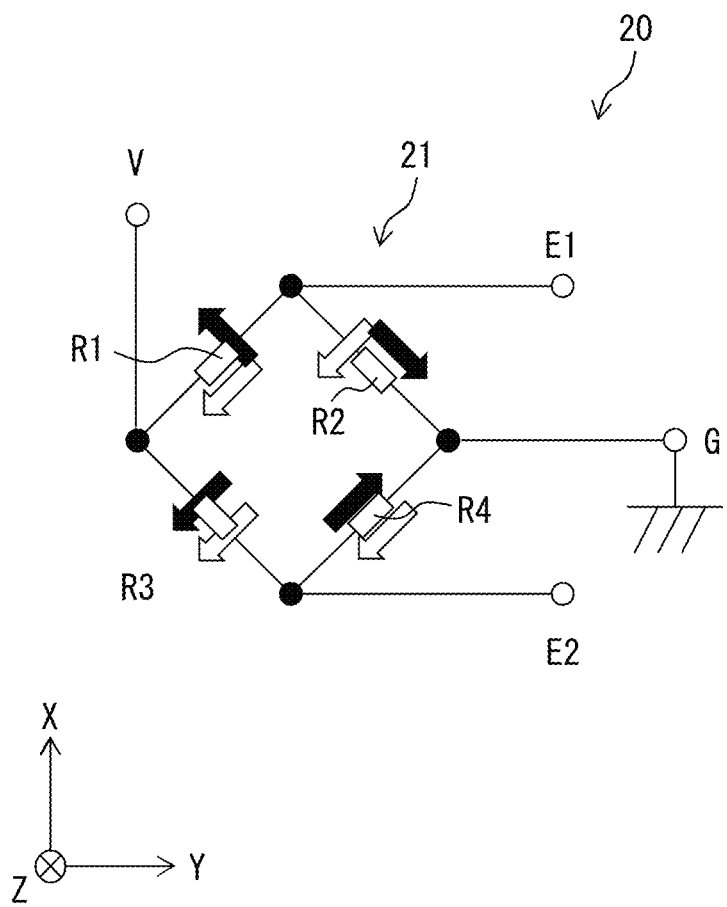
FIG. 8 is a circuit diagram illustrating a circuit configuration of the magnetic sensor in the position detection unit illustrated in FIG. 1.

Next, a configuration of the magnetic sensor 20 will be described with reference to FIG. 8. FIG. 8 is a circuit diagram illustrating an example configuration of the magnetic sensor 20. In the present example embodiment, the magnetic sensor 20 may be configured to generate, as the detection signal corresponding to the direction of the composite magnetic field MF, i.e., the detection-target magnetic field, a detection signal corresponding to an angle that the direction of the composite magnetic field Alf forms with respect to a reference direction.

As illustrated in FIG. 8, the magnetic sensor 20 may include a Wheatstone bridge circuit 21. The Wheatstone bridge circuit 21 may include: a power supply port V; a ground port G; two output ports E1 and E2; a first resistor R1 and a second resistor R2 coupled in series to each other; and a third resistor R3 and a fourth resistor R4 coupled in series to each other. A first end of the first resistor R1 and a first end of the third resistor R3 may each be coupled to the power supply port V. A second end of the first resistor R1 may be coupled to a first end of the second resistor R2 and the output port E1. A second end of the third resistor R3 may be coupled to a first end of the fourth resistor R4 and the output port E2. A second end of the second resistor R2 and a second end of the fourth resistor R4 may each be coupled to the ground port G. The power supply port V may receive a power supply voltage of a predetermined magnitude. The ground port G may be coupled to a ground. The output ports E1 and E1 may each be coupled to a controller 4 (FIG. 1).

In the present example embodiment, the first to fourth resistors R1 to R4 may each include a plurality of magnetoresistive effect (MR) elements. The MR elements may be coupled in series to each other. The MR elements may each be a spin-valve MR element. The spin-valve MR element may include a magnetization pinned layer, a free layer, and a nonmagnetic layer disposed between the magnetization pinned layer and the free layer. The magnetization pinned layer has a magnetization pinned in a certain direction. The free layer is a magnetic layer having a magnetization that changes its direction in accordance with the direction of the detection-target magnetic field. The spin-valve MR element may be a tunneling magnetoresistive effect (TMR) element or a giant magnetoresistive effect (GMR) element. In the TMR element, the nonmagnetic layer is a tunnel barrier layer. In the GMR element, the nonmagnetic layer is a nonmagnetic electrically-conductive layer. The spin-valve MR element changes in resistance in accordance with an angle that the magnetization direction of the free layer forms with respect to the magnetization direction of the magnetization pinned layer. The resistance of the spin-valve MR element is at a minimum value in a case where the foregoing angle is 0°, and at a maximum value in a case where the foregoing angle is 180°. In FIG. 8, the filled arrows indicate the magnetization directions of the magnetization pinned layers of the MR elements, and the hollow arrows indicate the magnetization directions of the free layers of the MR elements.

Figure 9:
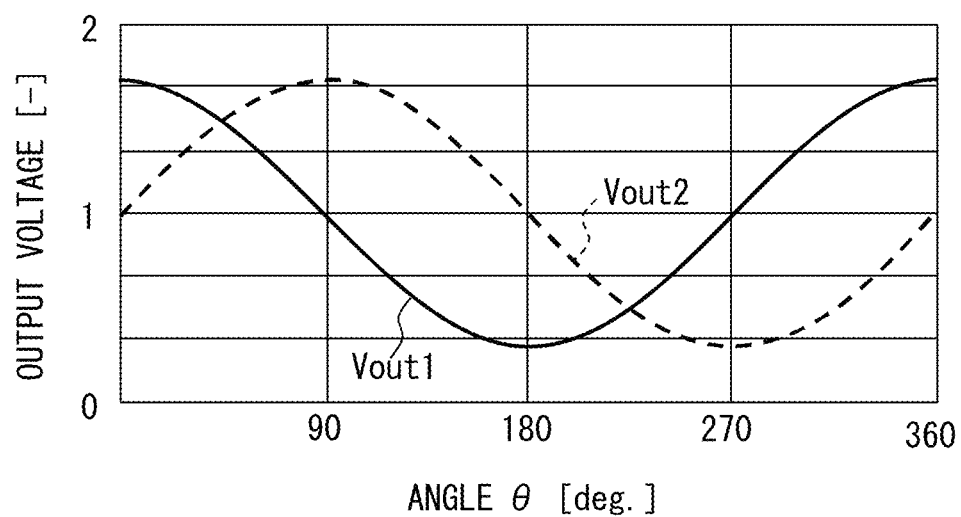
FIG. 9 is a characteristic diagram illustrating an output voltage characteristic to be obtained from the magnetic sensor illustrated in FIG. 1.

Hereinafter, the magnetization direction of the magnetization pinned layers of the MR elements included in the first resistor R1 will be simply referred to as a pinned direction of the first resistor R1, and the magnetization direction of the magnetization pinned layers of the MR elements included in the second resistor R2 will be simply referred to as a pinned direction of the second resistor R2. Further, the magnetization direction of the magnetization pinned layers of the MR elements included in the third resistor R3 will be simply referred to as a pinned direction of the third resistor R3, and the magnetization direction of the magnetization pinned layers of the MR elements included in the fourth resistor R4 will be simply referred to as a pinned direction of the fourth resistor R4. As illustrated in FIG. 8, the pinned direction of the first resistor R1 and the pinned direction of the second resistor R2 are opposite to each other. The pinned direction of the third resistor R3 and the pinned direction of the fourth resistor R4 are opposite to each other. Further, the pinned direction of the first resistor R1 and the pinned direction of the second resistor R2 are orthogonal to the pinned direction of the third resistor R3 and the pinned direction of the fourth resistor R4. Therefore, as illustrated in FIG. 9, for example, in a case where a voltage Vout1 outputted from the output port E1 changes in a cosinusoidal manner in accordance with an angle θ that the direction of the composite magnetic field MF forms with respect to the reference direction, a voltage Vout2 outputted from the output port E2 changes in a sinusoidal manner in accordance with the angle θ. In other words, the voltage Vout1 and the voltage Vout2 have a phase difference of 90° from each other for the angle θ. A signal corresponding to a potential difference between the output ports E1 and E2 may be outputted as a detection signal from a difference detector. The detection signal depends on a potential at the output port E1, a potential at the output port E2, and the potential difference between the output ports E1 and E2. The detection signal changes in accordance with the direction of the detection-target magnetic field, i.e., the composite magnetic field MF.

Considering, for example, the degree of accuracy with which the MR elements are fabricated, the magnetization directions of the magnetization pinned layers in the MR elements may slightly differ from the above-described directions.

Figure 10:
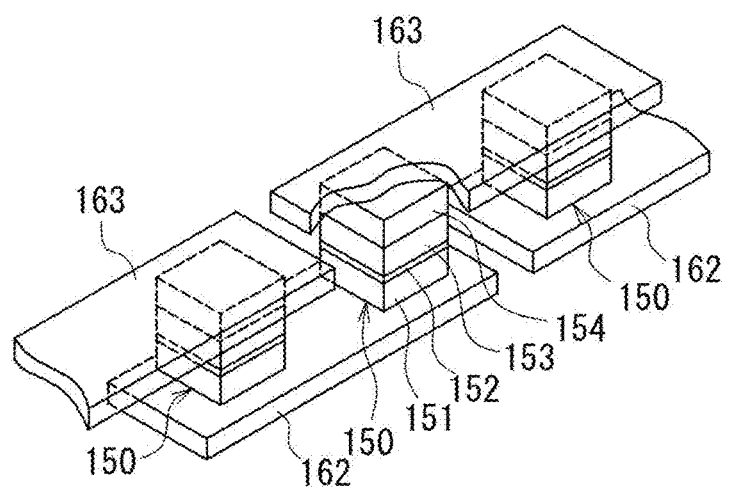
FIG. 10 is a perspective view of a portion of a resistor in FIG. 8.

An example configuration of the first to fourth resistors R1 to R4 will now be described with reference to FIG. 10. FIG. 10 is a perspective view of a portion of one resistor in the magnetic sensor 20 illustrated in FIG. 8. In this example, the resistor may include a plurality of lower electrodes 162, a plurality of magnetoresistive effect (MR) elements 150, and a plurality of upper electrodes 163. The lower electrodes 162 may be disposed on a substrate (not illustrated). The lower electrodes 162 may each have a long slender shape. Every two lower electrodes 162 adjacent to each other in the longitudinal direction thereof may have a gap therebetween. As illustrated in FIG. 10, two MR elements 150 may be disposed on the top surface of each lower electrode 162 at positions near opposite ends of the lower electrode 162 in the longitudinal direction thereof. The MR elements 150 may each include, for example, a magnetization free layer 151, a nonmagnetic layer 152, a magnetization pinned layer 153, and an antiferromagnetic layer 154 that are staked in this order from the lower electrode 162 side. The magnetization free layer 151 may be electrically coupled to the lower electrode 162. The antiferromagnetic layer 154 includes an antiferromagnetic material. The antiferromagnetic layer 154 may be exchange-coupled to the magnetization pinned layer 153 to thereby pin the magnetization direction of the magnetization pinned layer 153. The upper electrodes 163 may be disposed on the MR elements 150. The upper electrodes 163 may each have a long slender shape, and may electrically couple the respective antiferromagnetic layers 154 of two adjacent MR elements 150 that are disposed on two lower electrodes 162 adjacent to each other in the longitudinal direction of the lower electrodes 162. With such a configuration, the resistor illustrated in FIG. 10 may include the MR elements 150 coupled in series to each other by the lower electrodes 162 and the upper electrodes 163. It is to be noted that the magnetization free layer 151, the nonmagnetic layer 152, the magnetization pinned layer 153, and the antiferromagnetic layer 154 in the MR element 150 may be stacked in the reverse order to that illustrated in FIG. 10.

Next, operations of the drive unit 3 will be described with reference to FIGS. 1 to 6B. To begin with, the optical image stabilization mechanism and the autofocus mechanism will be described briefly. The drive unit 3 may constitute a part of each of the optical image stabilization mechanism and the autofocus mechanism. The drive unit 3, the optical image stabilization mechanism, and the autofocus mechanism may be controlled by the controller 4 (see FIG. 1) provided outside the imaging apparatus 100. The controller 4 may include, for example, circuitry including a central processing unit (CPU), a read only memory (ROM), and a random access memory (RAM). The CPU may serve as an operational processing unit. The ROM is a storage device that may store programs, operational parameters, etc. to be used by the CPU. The RAM is a storage device that may temporarily store parameters, etc. that change as appropriate during execution by the CPU.

The optical image stabilization mechanism may be configured to detect a hand-induced apparatus shake using a sensor such as a gyro sensor outside the imaging apparatus 100, for example. Upon detection of a hand-induced apparatus shake by the optical image stabilization mechanism, the controller 4 may control the drive unit 3 to change a relative position of the lens 5 with respect to the substrate 7 in accordance with the mode of the apparatus shake. This makes it possible to stabilize the absolute position of the lens 5 to thereby reduce an influence of the apparatus shake. It is to be noted that the relative position of the lens 5 with respect to the substrate 7 may change either in a direction parallel to the Y-axis or in a direction parallel to the Z-axis, depending on the mode of the apparatus shake.

The autofocus mechanism may be configured to detect an in-focus state of a subject using, for example, the image sensor 200 or an autofocus sensor. The controller 4 may cause the drive unit 3 to change the relative position of the lens 5 with respect to the substrate 7 along the Z-axis to bring the subject into focus. It is thereby possible to achieve automatic focusing on the subject.

Next, a description will be given of an operation of the drive unit 3 related to the optical image stabilization mechanism. Upon passage of electric currents through the coils 41 and 42 by the controller 4, an interaction between the magnetic fields occurring from the second magnets 31 and 32 and magnetic fields occurring from the coils 41 and 42 causes the second holding member 15 with the second magnets 31 and 32 fixed thereto to move along the Z-axis. As a result, the lens 5 also moves along the Z-axis. The controller 4 may detect the position of the lens 5 by measuring signals corresponding to the positions of the second magnets 31 and 32 generated by the magnetic sensors 30A and 30B.

Next, an operation of the drive unit 3 related to the autofocus mechanism will be described. In a case of moving the relative position of the lens 5 with respect to the substrate 7 along the X-axis, the controller 4 may pass an electric current through the coil 45 to cause the electric current to flow through the first conductor 45A in the +Y direction and flow through the second conductor 45B in the −Y direction. The controller 4 may further pass an electric current through the coil 46 to cause the electric current to flow through the first conductor 46A in the −Y direction and flow through the second conductor 46B in the +Y direction. These electric currents and the magnetic fields occurring from the second magnets 31 and 32 cause a Lorentz force in the +X direction to be exerted on the first conductor 45A and the second conductor 45B of the coil 45 and on the first conductor 46A and the second conductor 46B of the coil 46. This causes the first holding member 14 with the coils 45 and 46 fixed thereto to move in the +X direction. As a result, the lens 5 also moves in the +X direction.

In a case of moving the relative position of the lens 5 with respect to the substrate 7 in the −X direction, the controller 4 may pass electric currents through the coils 45 and 46 in directions opposite to those in the case of moving the relative position of the lens 5 with respect to the substrate 7 in the +X direction.

[Workings and Effects of Imaging Apparatus 100]

Next, a description will be given of workings and effects of the position detection unit 1 and the imaging apparatus 100 including the position detection unit 1 according to the present example embodiment. The position detection unit 1 according to the present example embodiment may be used to detect the position of the lens 5. In the present example embodiment, in the case where the relative position of the lens 5 with respect to the substrate 7 changes, the relative position of the first holding member 14 with respect to the substrate 7 and the second holding member 15 also changes. As described above, the first holding member 14 may hold the first magnet 10 serving as the first magnetic field generator, and the lens 5. The second holding member 15 may hold the second magnets 31 and 32 serving as the second magnetic field generator, and the magnetic sensor 20. Accordingly, as described above, a change in the relative position of the lens 5 results in a change in the relative position of the first magnet 10 with respect to the second magnets 31 and 32 and the magnetic sensor 20. In the present example embodiment, the relative position of the first magnet 10 with respect to the second magnets 31 and 32 and the magnetic sensor 20 may change in the direction of the optical axis of the lens 5, that is, in a direction parallel to the X-axis.

While the relative position of the first magnet 10 with respect to the second magnets 31 and 32 and the magnetic sensor 20 changes, relative positions of the second magnets 31 and 32 with respect to the magnetic sensor 20 do not change. Therefore, upon a change in the relative position of the first magnet 10 with respect to the second magnets 31 and 32 and the magnetic sensor 20, the intensity and the direction of the first magnetic field MF1 change, although neither of the intensity and the direction of the second magnetic field MF2 change. A change in each of the intensity and the direction of the first magnetic field MF1 changes the direction and the intensity of the composite magnetic field MF, and accordingly, changes the value of the detection signal to be generated by the magnetic sensor 20. The value of the detection signal to be generated by the magnetic sensor 20 changes in a manner dependent on the relative position of the first magnet 10 with respect to the substrate 7. The controller 4 may be configured to determine the angle θ of the direction of the composite magnetic field MF by performing operational processing from the detection signal of the magnetic sensor 20 that varies with magnetic field components including the magnetic field component Hsx along the X-axis direction and the magnetic field component Hsy along the Y-axis direction. The relative position of the first magnet 10 with respect to the substrate 7 indicates the relative position of the lens 5 with respect to the substrate 7.

As described above, the magnetic sensor 20 may include the Wheatstone bridge circuit 21 including, for example, the first to fourth resistors R1 to R4. The respective pinned directions of the first to fourth resistors R1 to R4 are antiparallel or orthogonal to each other. This makes it possible for the magnetic sensor 20 to detect, for example, a magnetic field Hx in the X-axis direction and a magnetic field Hy in the Y-axis direction that are included in the composite magnetic field MF.

The angle θ of the direction of the composite magnetic field MF is defined by Equation (1) below.

$$\theta = \arctan 2(Hsx+Hdx, Hsy+Hdy) \qquad (1)$$

where Hsx is a magnetic field component along the X-axis direction of the first magnetic field MF1, Hdx is a magnetic field component along the X-axis direction of the second magnetic field MF2, Hsy is a magnetic field component along the Y-axis direction of the first magnetic field MF1, and Hdy is a magnetic field component along the Y-axis direction of the second magnetic field MF2.

The magnetic field components Hdx and Hdy to be exerted on the magnetic sensor 20 are much weaker than the magnetic field components Hsx and Hsy to be exerted on the magnetic sensor 20. Therefore, in determining the angle θ of the direction of the composite magnetic field MF, the magnetic field components Hdx and Hdy are substantially negligible. The angle θ of the direction of the composite magnetic field MF to be exerted on the magnetic sensor 20 is thus expressible by Equation (2) below:

$$\theta \approx \arctan 2(Hsx, Hsy) \qquad (2).$$

The angle θ thus varies depending on the magnetic field components Hsx and Hsy.

Figure 11A:
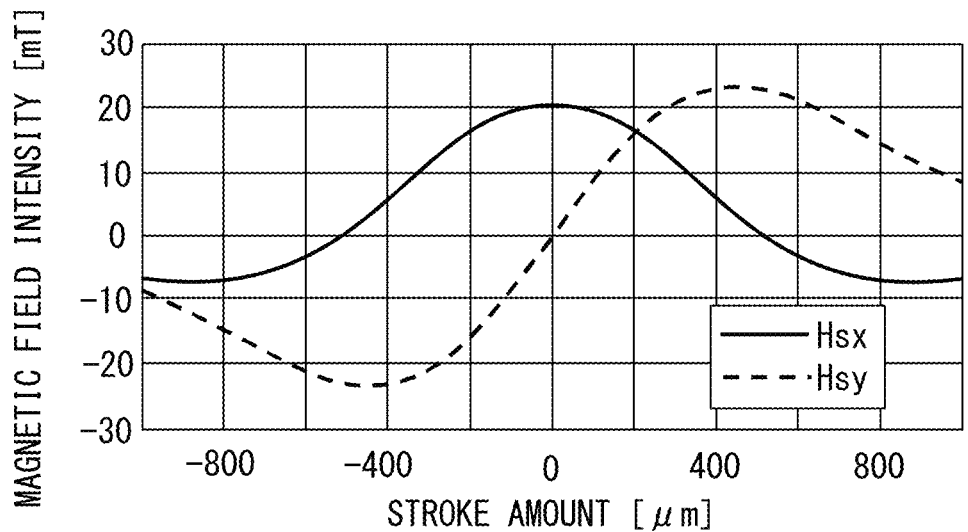
FIG. 11A is a characteristic diagram illustrating changes in the intensity of a magnetic field to be applied to the magnetic sensor associated with movement of the first magnet in the imaging apparatus illustrated in FIG. 1.
Figure 11B:
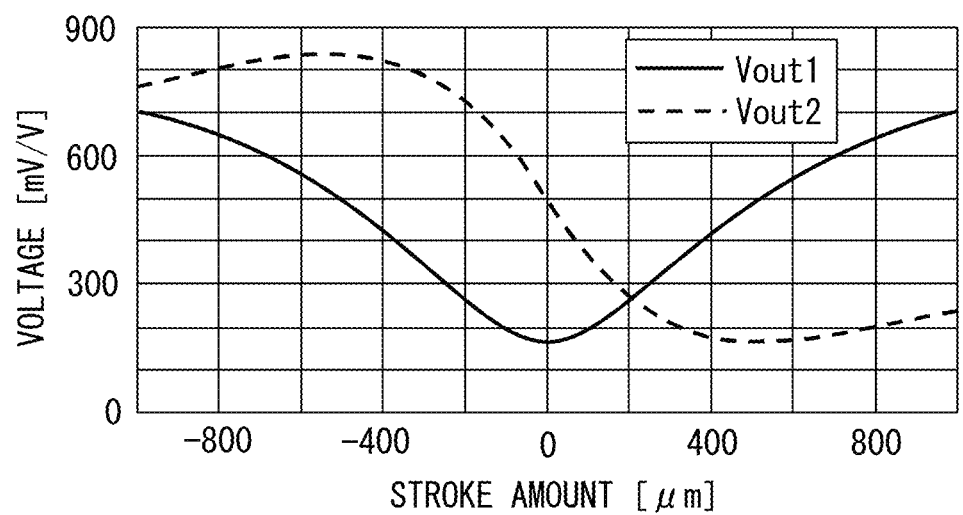
FIG. 11B is a characteristic diagram illustrating changes in the output voltage to be obtained from the magnetic sensor associated with movement of the first magnet in the imaging apparatus illustrated in FIG. 1.

In the imaging apparatus 100, the magnetic sensor 20 is subjected to the first magnetic field MF1 including the magnetic field component Hsx along the X-axis direction and the magnetic field component Hsy along the Y-axis direction that change as illustrated in, for example, FIG. 11A as the first magnet 10 moves along the X-axis direction with respect to the magnetic sensor 20. In this case, the voltages Vout1 and Vout2 changing as illustrated in FIG. 11B are detectable at the magnetic sensor 20. In FIG. 11A, the horizontal axis represents the stroke amount [μm] of the first magnet 10, that is, the position in the X-axis direction of the first magnet 10 with respect to a reference position, and the vertical axis represents the magnetic field intensity [mT] to be detected at the magnetic sensor 20. In FIG. 11B, the horizontal axis represents the stroke amount [μm] of the first magnet 10, and the vertical axis represents the voltages [mV/V] to be outputted from the magnetic sensor 20. The controller 4 may treat the voltages Vout1 and Vout2 as a cosine curve (Vx cos θ) and a sine curve (Vx sin θ), respectively, for the angle θ of the direction of the composite magnetic field MF and calculate, in accordance with the following equation, the angle θ that changes with the position of the first magnet 10 in the X-axis direction (see FIG. 11C).

θ [deg.]=arctan($Tx(Vx \sin θ)/(Vx \cos θ)$).

Figure 11C:
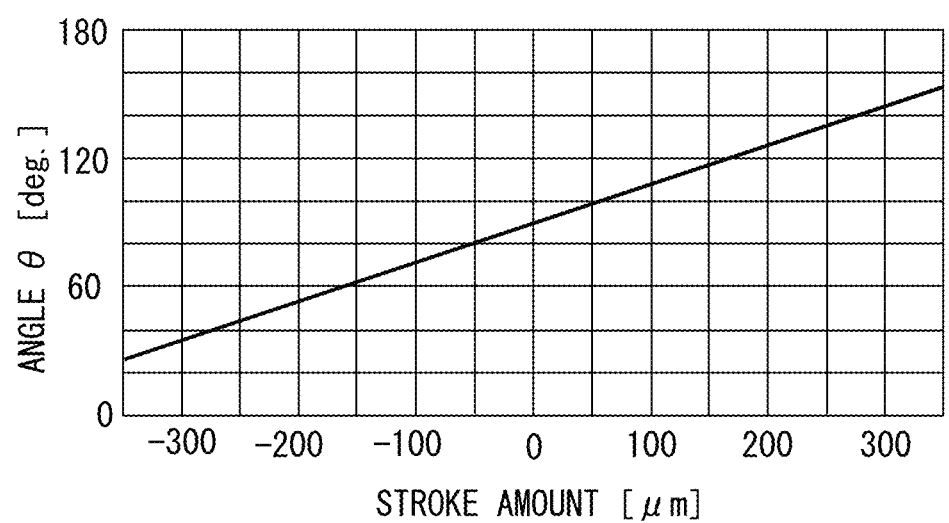
FIG. 11C is a characteristic diagram illustrating changes in the angle of the direction of a composite magnetic field with respect to a stroke amount of the first magnet.

In FIG. 11C, the horizontal axis represents the stroke amount [μm] of the first magnet 10 in the X-axis direction, and the vertical axis represents the angle θ [deg.]. As illustrated in FIG. 11C, the angle θ changes substantially linearly with respect to the stroke amount of the first magnet 10. Therefore, the position of the first magnet 10 in the X-axis direction, i.e., the stroke amount of the first magnet 10, is unambiguously determinable by calculating the angle θ. Note that the constant T in the above equation is a correction factor.

Figure 12A:
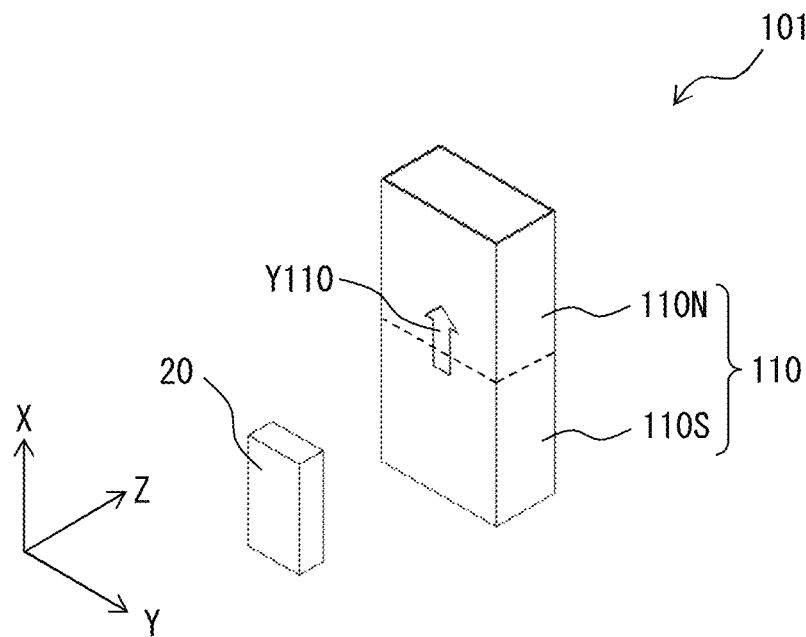
FIG. 12A is an enlarged perspective diagram illustrating a configuration example of a position detection unit including a magnet according to a reference example.
Figure 12B:
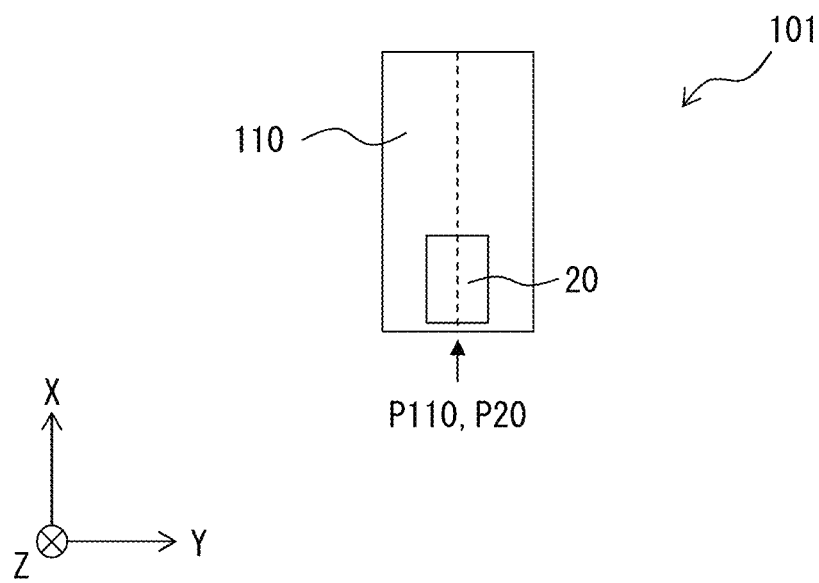
FIG. 12B is a schematic diagram for describing a positional relationship between the magnet and the magnetic sensor in the position detection unit according to the reference example illustrated in FIG. 12A.

To clarify the technical significance of the technology, as a reference example, a case will be described in which a magnet 110 having only a pair of N and S poles as illustrated in FIGS. 12A and 12B is used in place of the first magnet 10 that is a multipolar magnet, and the stroke amount of the magnet 110 is determined. This reference example may be the same in configuration as the present example embodiment except that the magnet 110 is used in place of the first magnet 10 and that a center position P110 of the magnet 110 in the Y-axis direction and the center position P20 of the magnetic sensor 20 in the Y-axis direction coincide with each other. FIG. 12A is a schematic perspective view of a position detection unit 101 of the reference example, and corresponds to FIG. 4A illustrating the position detection unit 1 of the present example embodiment.

Figure 13A:
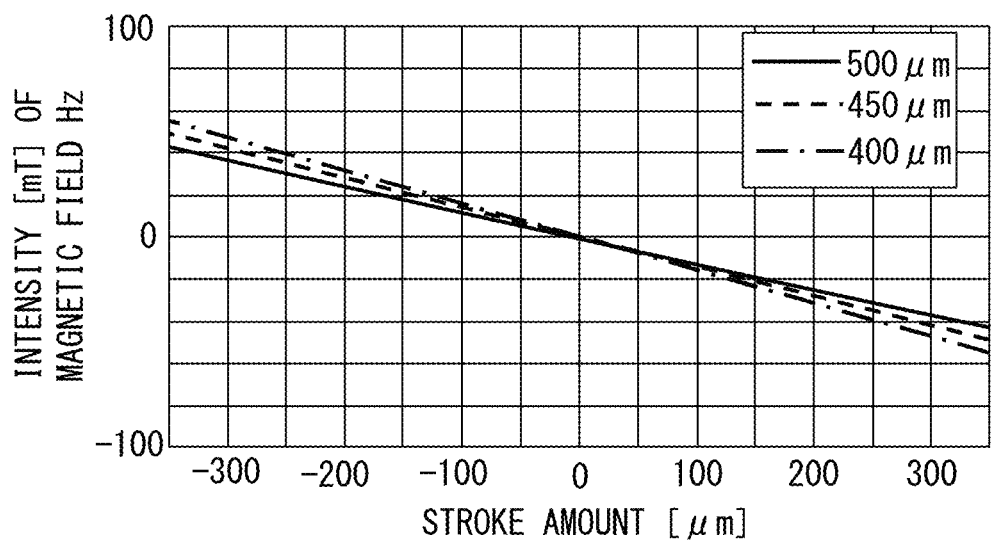
FIG. 13A is a characteristic diagram illustrating a relationship between the stroke amount of the magnet and a magnetic field intensity in the position detection unit according to the reference example illustrated in FIG. 12A.
Figure 13B:
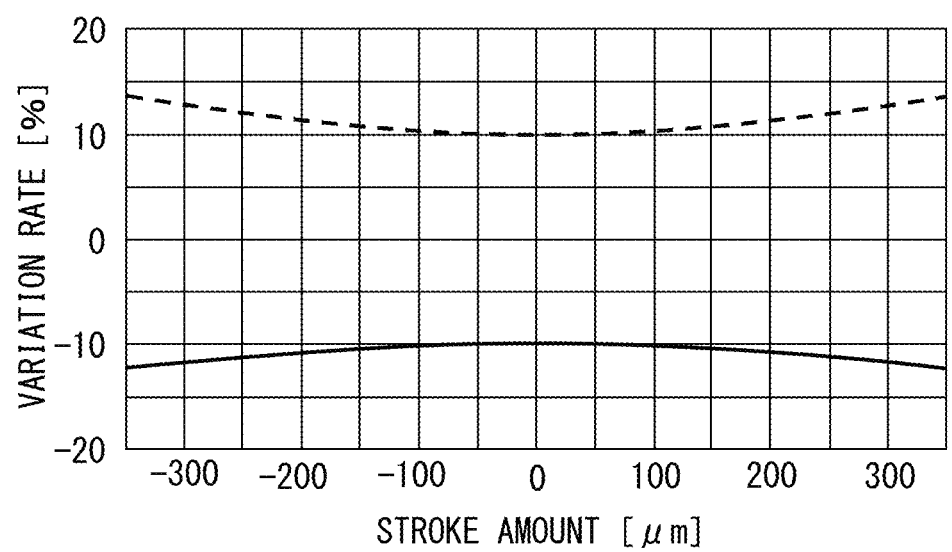
FIG. 13B is a characteristic diagram illustrating a relationship between the stroke amount of the magnet and a variation rate of the magnetic field intensity in the position detection unit according to the reference example illustrated in FIG. 12A.

The magnet 110 may have an N pole 110N and an S pole 110S, and may be magnetized in a direction indicated by an arrow Y110. Here, a simulation was performed to determine an intensity of a magnetic field Hz in the Z-axis direction to be detected at the magnetic sensor 20 including a TMR element when the magnet 110 having dimensions of 1.3 mm, 0.8 mm, and 0.5 mm in the X-axis, Y-axis, and Z-axis directions, respectively, and including a material of grade N48SH was moved in the X-axis direction. The results are given in FIG. 13A. In FIG. 13A, the horizontal axis represents the stroke amount [μm] of the magnet 110, that is, the position in the X-axis direction of the magnet 110 with respect to a reference position, and the vertical axis represents the intensity [mT] of the magnetic field Hz to be detected at the magnetic sensor 20. FIG. 13A illustrates changes in the intensity of the magnetic field Hz obtained with the distance between the magnetic sensor 20 and the magnet 110 in the Z-axis direction set at 400 μm, 450 μm, and 500 μm. It is seen from FIG. 13A that in the reference example, the intensity of the magnetic field Hz changed substantially linearly with respect to the stroke amount of the magnet 110. However, in the reference example, the gradient of change in the intensity of the magnetic field Hz with respect to the stroke amount of the magnet 110 in the X-axis direction varied depending on the distance or gap between the magnetic sensor 20 and the magnet 110 in the Z-axis direction. Accordingly, a variation rate [%] of the intensity of the magnetic field Hz resulting from the variations in the distance between magnetic sensor 20 and the magnet 110 in the Z-axis direction increased in absolute value as the stroke amount of the magnet 110 in the X-axis direction increased in absolute value, as described in FIG. 13B. In the position detection unit 101 of the reference example, a variation rate in a range of about 10% to about 14% developed. In FIG. 13B, the solid line represents the percentage of error (i.e., the variation rate [%]) of the intensity of the magnetic field Hz in the case where the distance between the magnetic sensor 20 and the magnet 110 in the Z-axis direction was 400 μm with respect to the intensity of the magnetic field Hz in the case where the distance between the magnetic sensor 20 and the magnet 110 in the Z-axis direction was 450 μm. In FIG. 13B, the broken line represents the percentage of error (i.e., the variation rate [%]) of the intensity of the magnetic field Hz in the case where the distance between the magnetic sensor 20 and the magnet 110 in the Z-axis direction was 500 μm with respect to the intensity of the magnetic field Hz in the case where the distance between the magnetic sensor 20 and the magnet 110 in the Z-axis direction was 450 μm. The results in FIG. 13B indicate that it is possible to determine an accurate intensity of the magnetic field Hz responsive to the stroke amount if the magnet 110 is able to move in the X-axis direction with the distance from the magnetic sensor 20 in the Z-axis direction kept constant; however, it becomes difficult to determine an accurate intensity of the magnetic field Hz responsive to the stroke amount if the distance between the magnetic sensor 20 and the magnet 110 in the Z-axis direction can vary when the magnet 110 moves in the X-axis direction. In actuality, it is difficult to prevent the distance between the magnetic sensor 20 and the magnet 110 in the Z-axis direction from having an error of about ±50 μm as the magnet 110 moves in the X-axis direction.

Figure 14A:
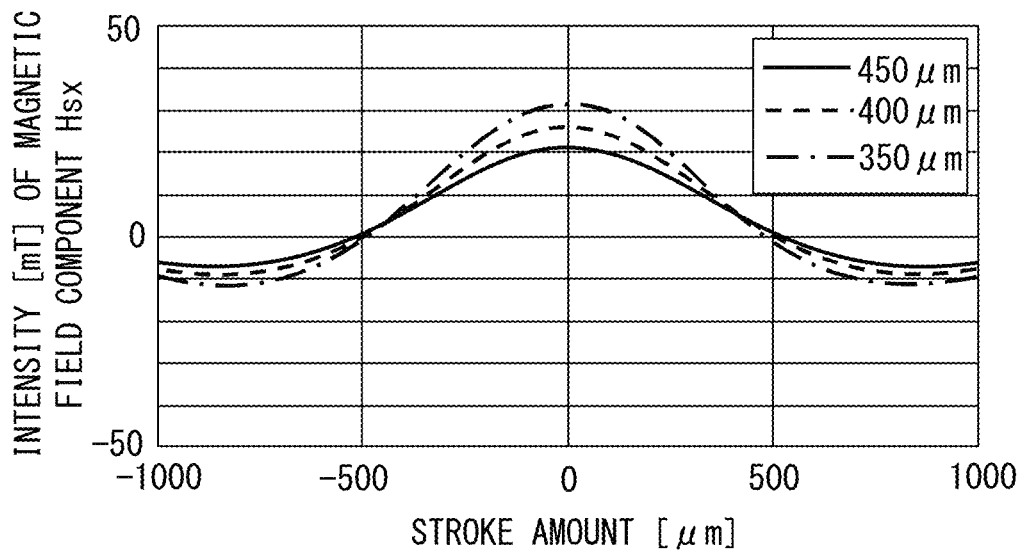
FIG. 14A is a first characteristic diagram illustrating a relationship between the stroke amount of the first magnet and the magnetic field intensity in the position detection unit illustrated in FIG. 4A.
Figure 14B:
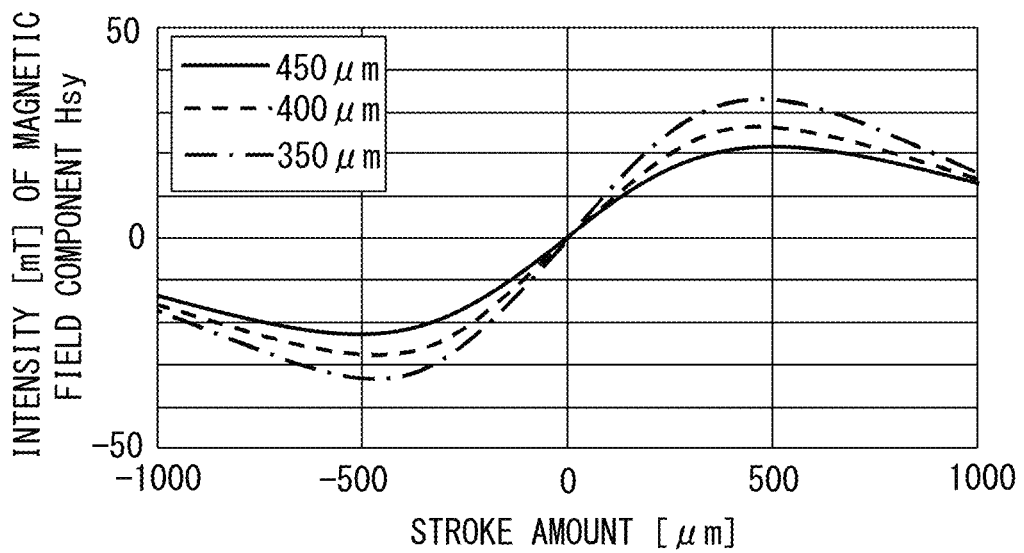
FIG. 14B is a second characteristic diagram illustrating the relationship between the stroke amount of the first magnet and the magnetic field intensity in the position detection unit illustrated in FIG. 4A.

FIG. 14A is a characteristic diagram illustrating a relationship between the stroke amount of the first magnet 10 in the X-axis direction and the intensity of the magnetic field component Hsx in the X-axis direction to be applied to the magnetic sensor 20 in the position detection unit 1 of the present example embodiment. FIG. 14B is a characteristic diagram illustrating a relationship between the stroke amount of the first magnet 10 in the X-axis direction and the intensity of the magnetic field component Hsy in the Y-axis direction to be applied to the magnetic sensor 20 in the position detection unit 1 of the present example embodiment. The graphs in FIGS. 14A and 14B were obtained by simulation. FIGS. 14A and 14B illustrate respective changes in the intensities of the magnetic field components Hsx and Hsy each obtained with the distance between the magnetic sensor 20 and the first magnet 10 in the Z-axis direction set at 350 μm, 400 μm, and 450 μm. It is seen from FIGS. 14A and 14B that the variations in the distance between the magnetic sensor 20 and the first magnet 10 in the Z-axis direction varied the intensities of the magnetic field components Hsx and Hsy. Note that the simulation results in FIGS. 14A and 14B were obtained with the first magnet 10 having dimensions of 1.2 mm, 1.0 mm, and 0.5 mm in the X-axis, Y-axis, and Z-axis directions, respectively, and including a material of grade N48SH. Further, the center position P20 of the magnetic sensor 20 was offset from the position P10 of the interfaces 11K and 12K in the Y-axis direction by 0.25 mm in the +Y direction. The position P10 of the interfaces 11K and 12K in the Y-axis direction was set to be the center position of the first magnet 10 in the Y-axis direction.

Figure 14C:
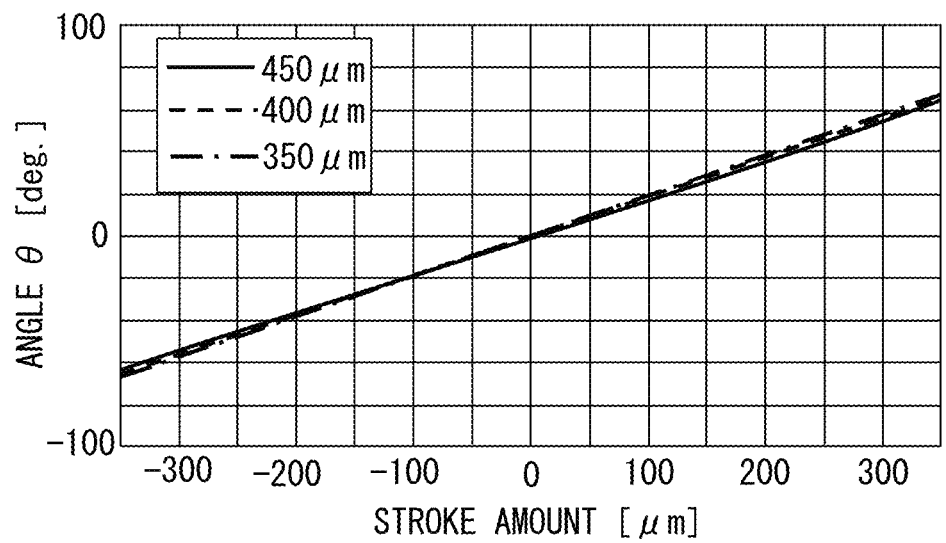
FIG. 14C is a characteristic diagram illustrating the relationship between the stroke amount of the first magnet and the angle of the direction of the composite magnetic field in the position detection unit illustrated in FIG. 4A.
Figure 14D:
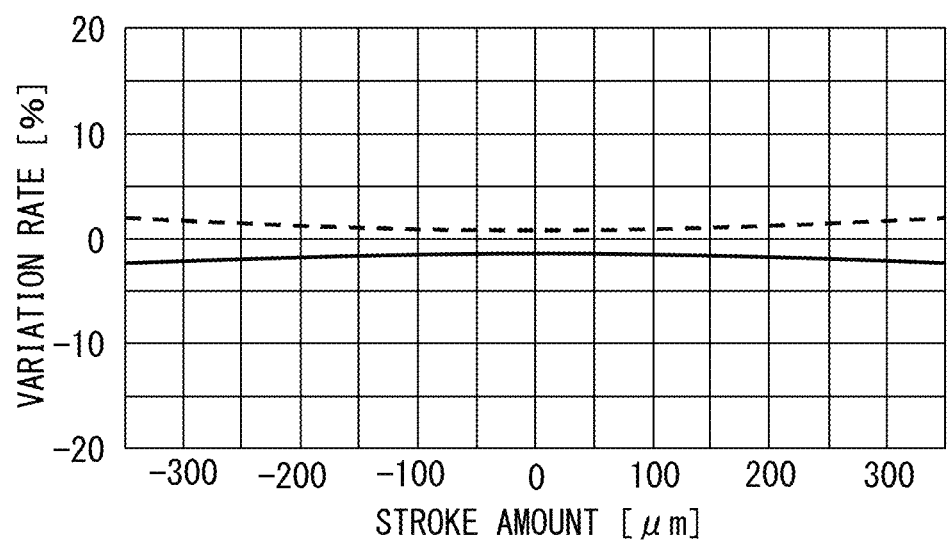
FIG. 14D is a characteristic diagram illustrating the relationship between the stroke amount of the first magnet and the variation rate of the angle of the direction of the composite magnetic field in the position detection unit illustrated in FIG. 4A.

However, it is seen from FIG. 14C that in the position detection unit 1 of the present example embodiment, the value of the angle θ obtained from the magnetic field component Hsx and the magnetic field component Hsy with respect to the stroke amount of the first magnet 10 was less susceptible to variations in the distance between the magnetic sensor 20 and the first magnet 10 in the Z-axis direction. FIG. 14C is a characteristic diagram illustrating changes in the angle θ of the direction of the composite magnetic field MF obtained from the magnetic field components Hsx and Hsy with respect to the stroke amount of the first magnet 10 in the X-axis direction. For the reason described above, as illustrated in FIG. 14D, an increase in the absolute value of the variation rate [%] of the angle θ associated with a variation in the distance between the magnetic sensor 20 and the first magnet 10 in the Z-axis direction was suppressed even if the absolute value of the stroke amount of the first magnet 10 in the X-axis direction increased. In the position detection unit 1, the variation rate was suppressed to a range of about 1% to about 2%. In FIG. 14D, the solid line represents the percentage of error (i.e., the variation rate [%]) of the angle θ in the case where the distance between the magnetic sensor 20 and the first magnet 10 in the Z-axis direction was 350 μm with respect to the angle θ in the case where the distance between the magnetic sensor 20 and the first magnet 10 in the Z-axis direction was 400 μm. In FIG. 14D, the broken line represents the percentage of error (i.e., the variation rate [%]) of the angle θ in the case where the distance between the magnetic sensor 20 and the first magnet 10 in the Z-axis direction was 450 μm with respect to the angle θ in the case where the distance between the magnetic sensor 20 and the first magnet 10 in the Z-axis direction was 400 μm. The results in FIG. 14D indicate that it is possible to determine an accurate angle θ responsive to the stroke amount of the first magnet 10 even in a case where the distance between the magnetic sensor 20 and the first magnet 10 in the Z-axis direction varies when the first magnet 10 moves in the X-axis direction and even in a case where the distance has an error of about ±50 μm, for example. This indicates that according to the position detection unit 1, it is possible to determine the stroke amount of the first magnet 10 accurately from the angle θ calculated form the magnetic field components Hsx and Hsy.

As described above, in the position detection unit 1 of the present example embodiment, a multipolar magnet is used as the first magnet 10 that is spaced from and opposed to the magnetic sensor 20 in the Z-axis direction and movable in the X-axis direction. This makes it possible for the magnetic sensor 20 to be subjected to the magnetic field component Hsx in the X-axis direction and the magnetic field component Hsy in the Y-axis direction that have a phase difference of, for example, 90°. Furthermore, in the position detection unit 1, the center position P20 of the magnetic sensor 20 in the Y-axis direction is different from the position P10 in the Y-axis direction of the interfaces 11K and 12K between the N and S poles adjacent to each other in the Y-axis direction. This allows the magnetic field component Hsx to be sufficiently applied to the magnetic sensor 20. According to the position detection unit 1 of the present example embodiment, it is thus possible to detect the angle θ of the direction of the composite magnetic field MF responsive to the stroke amount of the first magnet 10 with high accuracy by using the magnetic field components Hsx and Hsy detected at the magnetic sensor 20. The intensity of the magnetic field component Hsx and the intensity of the magnetic field component Hsy each vary in accordance with the distance between the first magnet 10 and the magnetic sensor 20. However, determining the angle θ by angle computation using the ratio between the voltage Vout1 corresponding to the intensity of the magnetic field component Hsx and the voltage Vout2 corresponding to the intensity of the magnetic field component Hsy makes it possible to reduce an influence of the variation in the distance between the first magnet 10 and the magnetic sensor 20 on the angle θ. The position detection unit 1 is configured to determine the angle θ of the direction of the composite magnetic field MF by angle computation using the ratio between the voltage Vout1 corresponding to the intensity of the magnetic field component Hsx and the voltage Vout2 corresponding to the intensity of the magnetic field component Hsy. This also helps to prevent a reduction in accuracy of detection of the stroke amount of the first magnet 10 associated with a change in environmental temperature. Typically, the intensity of a magnetic field generated by a magnet varies with variations in temperature; however, the temperature dependence of the intensity of the magnetic field component Hsx from the first magnet 10 and the temperature dependence of the intensity of the magnetic field component Hsy from the first magnet 10 coincide with each other. Therefore, by using the ratio between the intensity of the magnetic field component Hsx and the intensity of the magnetic field component Hsy to calculate the angle θ, the calculated angle θ is substantially constant irrespective of the environmental temperature. According to the position detection unit 1, it is therefore possible to accurately determine the stroke amount of the first magnet 10 from the angle θ calculated from the magnetic field component Hsx and the magnetic field component Hsy.

In the present example embodiment, a sensing plane of, for example, each TMR element in the magnetic sensor 20 may be substantially parallel to the direction of magnetization of the first magnet 10. This facilitates mounting of the magnetic sensor 20 and the first magnet 10.

2. Modification Examples

The technology has been described above with reference to the example embodiment. However, the technology is not limited thereto, and may be modified in a variety of ways. For example, the foregoing example embodiment has been described with reference to a case where four resistors are used to form a full-bridge circuit in the magnetic sensor. However, in some embodiments of the technology, for example, two resistors may be used to form a half-bridge circuit. Further, the magnetoresistive effect elements may be identical with each other or different from each other in shape and/or dimensions. The resistors may each include a magnetic detection element, for example. As used herein, the term "magnetic detection element" refers to any element having a function of detecting a magnetic field, and may encompass not only a spin-valve MR element but also other elements including, without limitation, an anisotropic magnetoresistive effect (AMR) element and a Hall element (including a planar Hall element and a vertical Hall element, for example). Further, the dimensions of components and the layouts of the components are merely illustrative, and are not limited thereto.

The position detection unit of an embodiment of the technology is not limited to a unit configured to detect the position of a lens but may be a unit configured to detect the position of any object other than a lens in a space.

Figure 15:
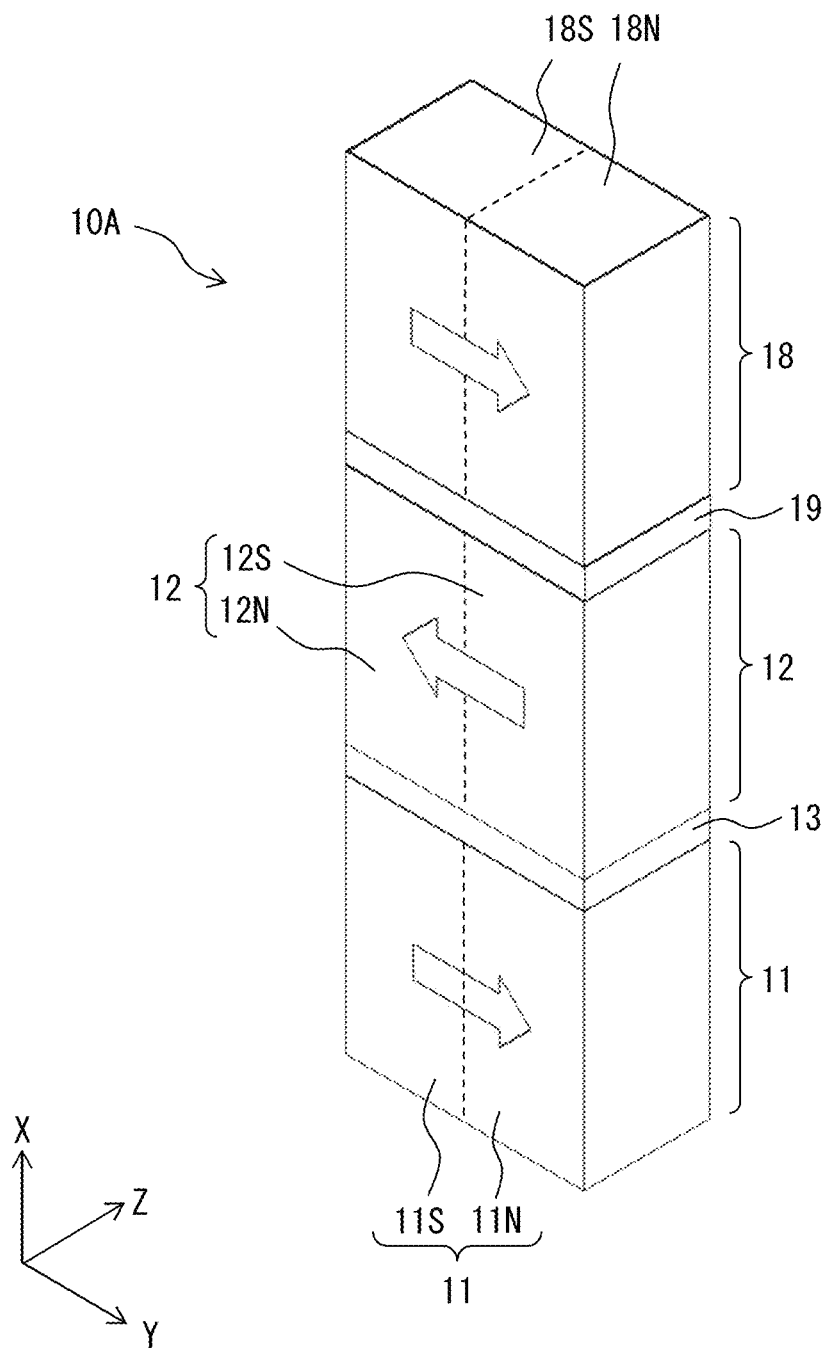
FIG. 15 is an enlarged perspective diagram illustrating a configuration example of a first magnet according to one modification example of the example embodiment of the technology.

In the foregoing example embodiment, the first magnet 10 may include two N poles 11N and 12N and two S poles 11S and 12S; however, the first multipolar magnet of embodiments of the technology is not limited thereto, and may be, for example, a first magnet 10A according to a first modification example illustrated in FIG. 15. The first magnet 10 may include two region parts, i.e., the first region part 11 and the second region part 12, whereas the first magnet 10A may further include a third region part 18 in addition to the first region part 11 and the second region part 12. A neutral zone 19 may be provided between the second region part 12 and the third region part 18.

Figure 16:
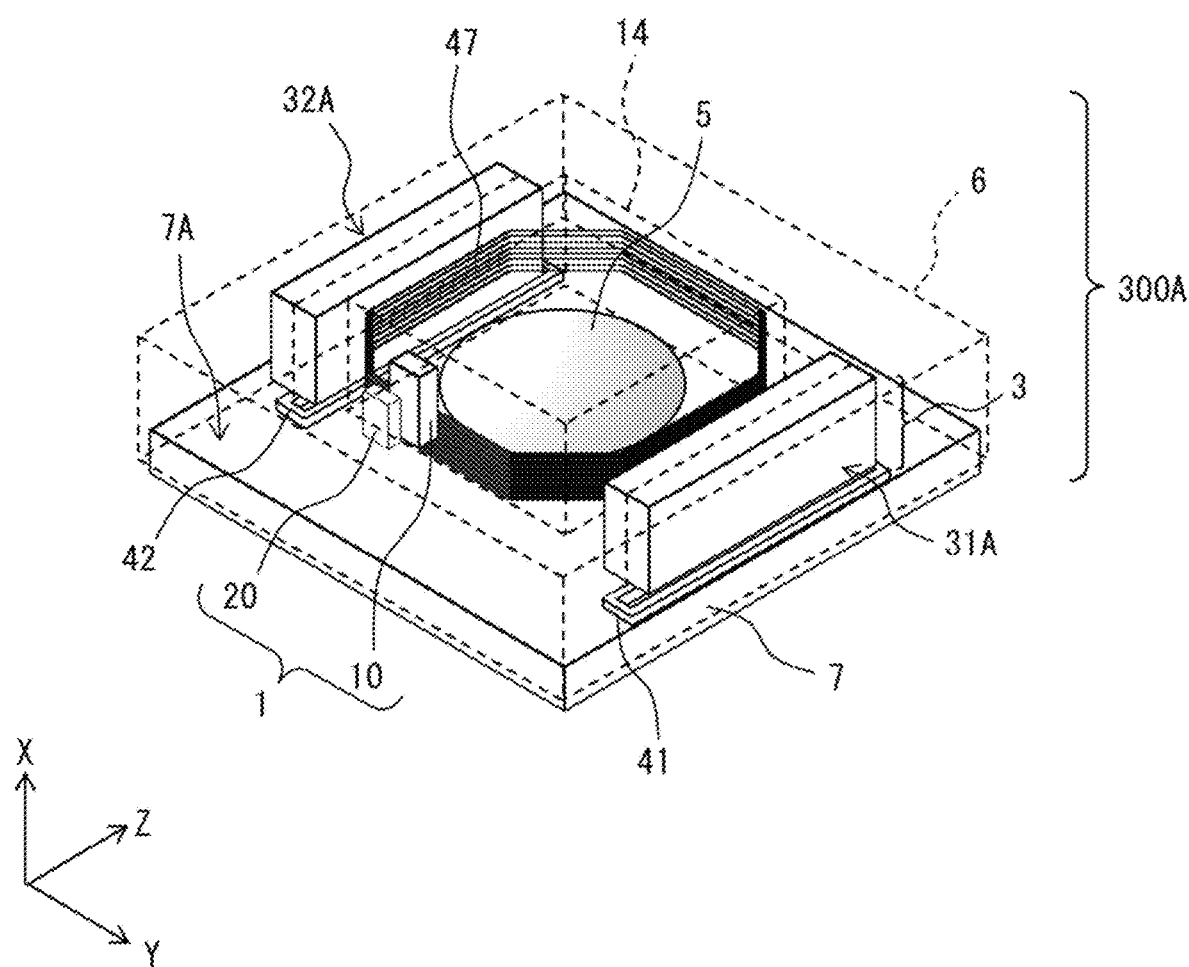
FIG. 16 is a perspective diagram illustrating a configuration example of a lens module according to one modification example of the example embodiment of the technology.
Figure 17:
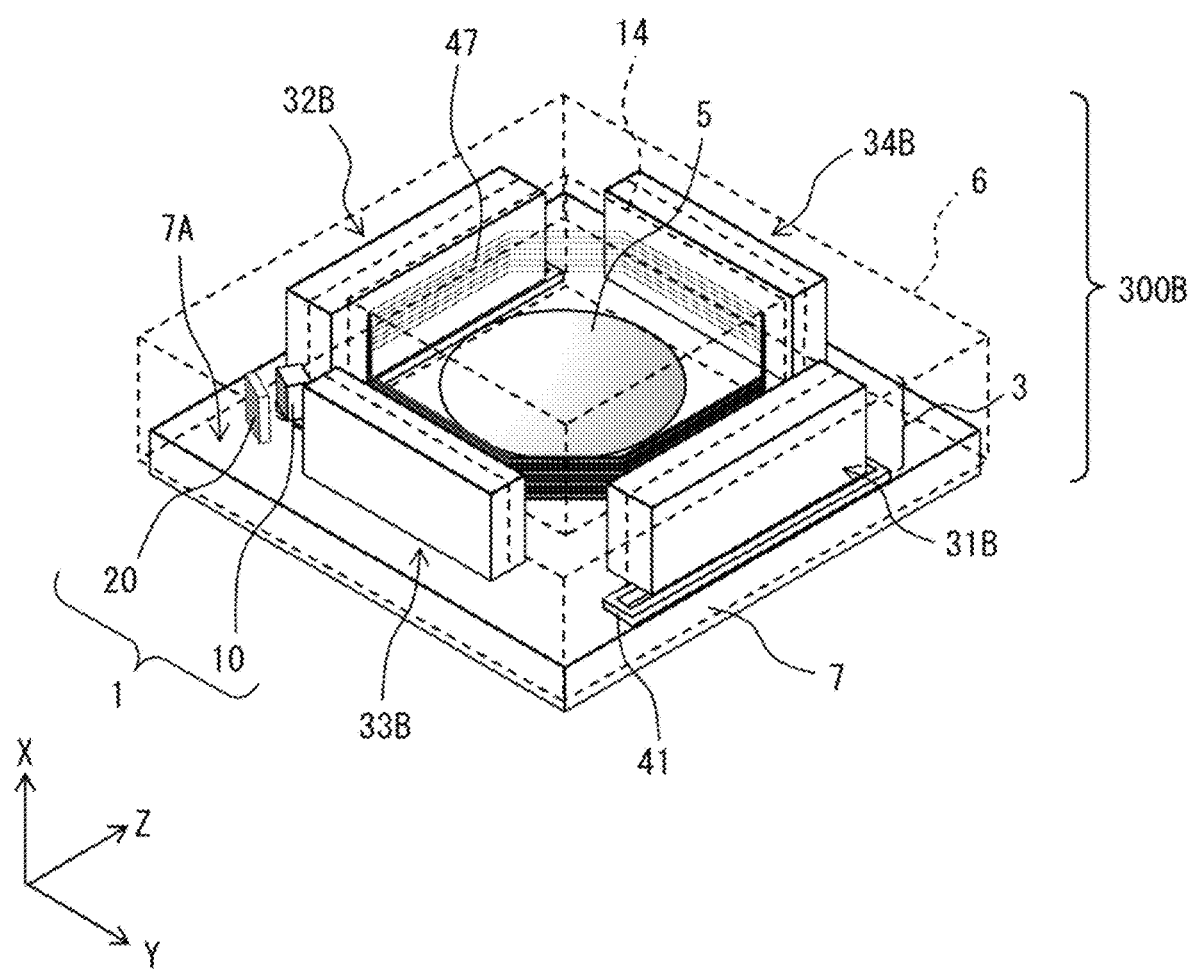
FIG. 17 is a perspective diagram illustrating a configuration example of a lens module according to one modification example of the example embodiment of the technology.

In the foregoing example embodiment, the second magnets 31 and 32 serving as drive magnets to generate a drive force to cause the first magnet 10, the coils 45 and 46, and the lens 5 to move in the X-axis direction may each be a multipolar magnet; however, embodiments of the technology are not limited thereto. For example, a lens module 300A according to a second modification example illustrated in FIG. 16 may include second magnets 31A and 32A each including a single N pole and a single S pole. Further, a lens module 300B according to a third modification example illustrated in FIG. 17 may include four second magnets 31B to 34B each including a single N pole and a single S pole. Note that the lens modules 300A and 300B in FIGS. 16 and 17 may each include, in place of the coils 45 and 46, a coil 47 surrounding the lens 5 along a Y-Z plane.

Figure 18:
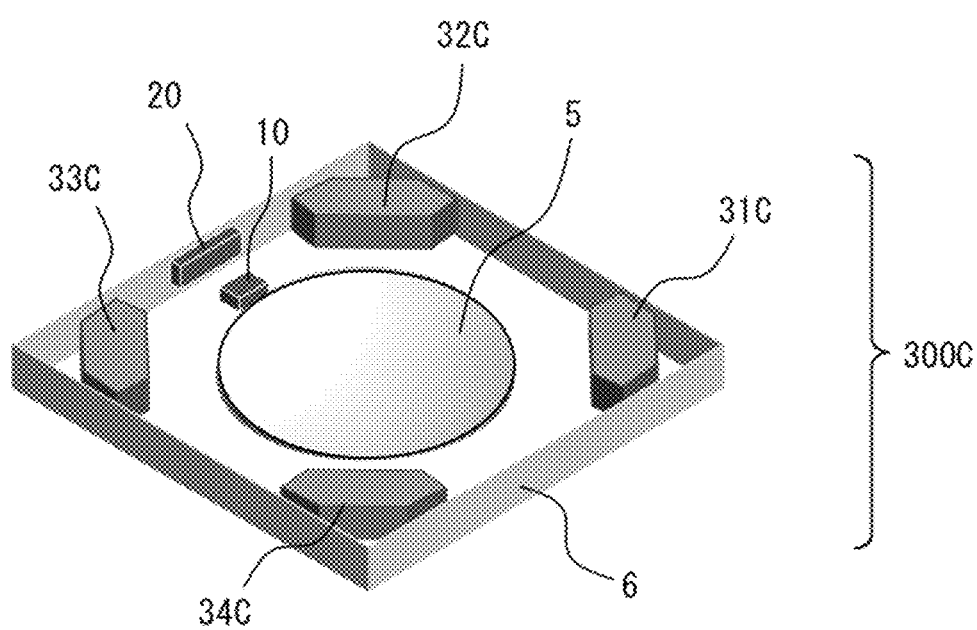
FIG. 18 is a perspective diagram illustrating a configuration example of a lens module according to one modification example of the example embodiment of the technology.

In the example embodiment and the modification examples described above, the second magnets may be arranged at two sides or four sides of a square or rectangular region along the top surface 7A of the substrate 7. However, embodiments of the technology are not limited thereto. For example, a lens module 300C according to a fourth modification example illustrated in FIG. 18 may include four drive magnets 31C to 34C arranged at four corners of the housing 6. Note that FIG. 18 omits the illustrations of the coil 47 and the substrate 7.

In the example embodiment and the modification examples described above, the first magnet 10, which is a multipolar magnet, is described as an example of the first magnetic field generator. However, in some embodiments, the first magnetic field generator may include a plurality of bipolar magnets, or a plurality of multipolar magnets. The bipolar magnets may be in contact with each other, or may be separated from each other. Likewise, the multipolar magnets may be in contact with each other, or may be separated from each other. Alternatively, the first magnetic field generator may include both of a bipolar magnet and a multipolar magnet.

It is to be noted that, as used herein, the term "orthogonal" may encompass not only being geometrically exactly 90° but also being 90° plus or minus a manufacturing error or so, e.g., plus or minus about 5°.

The technology encompasses any possible combination of some or all of the various embodiments and the modifications described herein and incorporated herein.

It is possible to achieve at least the following configurations from the foregoing embodiments and modification examples of the technology.

(1)

A position detection unit including:

a magnetic sensor; and a first magnetic field generator spaced from and opposed to the magnetic sensor in a first-axis direction, including a first multipolar magnet and generating a first magnetic field to be exerted on the magnetic sensor, the first multipolar magnet including a plurality of N poles and a plurality of S poles, the N and S poles being adjacent to each other along a plane orthogonal to the first-axis direction, in which the magnetic sensor and the first magnetic field generator are relatively movable with respect to each other along a second-axis direction orthogonal to the first-axis direction, and a center position of the magnetic sensor in a third-axis direction orthogonal to both of the first-axis direction and the second-axis direction is different from a position in the third-axis direction of an interface between the N and S poles adjacent to each other in the third-axis direction.

(2)

The position detection unit according to (1), in which the first magnetic field includes a first magnetic field component, and a second magnetic field component having a phase difference from the first magnetic field component, and the magnetic sensor is configured to generate a detection signal corresponding to a direction of a detection-target magnetic field, and configured to detect a positional change of the first magnetic field generator, the detection-target magnetic field being a magnetic field to be detected, and being a composite of the first magnetic field component and the second magnetic field component in the plane.

(3)

The position detection unit according to (1) or (2), in which the first multipolar magnet includes a first N pole and a second N pole as the plurality of N poles, and a first S pole and a second S pole as the plurality of S poles, the first N pole and the first S pole are adjacent to each other in the third-axis direction, the second N pole and the second S pole are adjacent to each other in the third-axis direction, the first N pole and the second S pole are adjacent to each other in the second-axis direction, and the second N pole and the first S pole are adjacent to each other in the second-axis direction.

(4)

The position detection unit according to any one of (1) to (3), in which the first multipolar magnet includes a first region part magnetized in a first direction along the third-axis direction, and a second region part magnetized in a second direction that is along the third-axis direction and opposite to the first direction.

(5)

The position detection unit according to (4), in which the first multipolar magnet further includes a neutral zone between the first region part and the second region part.

(6)

The position detection unit according to (5), in which the neutral zone extends along the third-axis direction.

(7)

The position detection unit according to any one of (1) to (6), in which the first multipolar magnet has a longitudinal direction along the second-axis direction.

(8)

The position detection unit according to any one of (1) to (7), in which the interface extends along the second-axis direction.

(9)

The position detection unit according to any one of (1) to (8), in which the magnetic sensor and the first multipolar magnet are relatively movable with respect to each other along the second-axis direction while keeping a state of overlapping each other in the first-axis direction.

(10)

The position detection unit according to any one of (1) to (9), further including a second magnetic field generator generating a second magnetic field, in which the first magnetic field generator is movable along the second-axis direction with respect to the magnetic sensor and the second magnetic field generator owing to the second magnetic field.

(11)

The position detection unit according to (10), in which the second magnetic field generator includes a second multipolar magnet including a plurality of N poles and a plurality of S poles.

(12)

The position detection unit according to (11), in which the second magnetic field generator includes a pair of the second multipolar magnets, the second multipolar magnets being opposed to each other in the third-axis direction and each extending along the first-axis direction, and the magnetic sensor is interposed between the second multipolar magnets in the third-axis direction.

(13)

The position detection unit according to any one of (10) to (12), further including a first holding member holding the first magnetic field generator, in which the first holding member is movable in the second-axis direction owing to the second magnetic field.

(14)

The position detection unit according to (13), in which the first holding member is configured to hold a lens having an optical axis along the second-axis direction.

(15)

The position detection unit according to any one of (10) to (14), further including a second holding member holding the magnetic sensor and the second magnetic field generator.

(16)

The position detection unit according to any one of (1) to (15), in which the magnetic sensor is configured to detect each of an intensity of a first magnetic field component along the second-axis direction and an intensity of a second magnetic field component along the third-axis direction.

(17)

The position detection unit according to any one of (1) to (15), in which the magnetic sensor is configured to detect a direction of a composite magnetic field, the composite magnetic field being a composite of a first magnetic field component along the second-axis direction and a second magnetic field component along the third-axis direction.

(18)

A lens module including:

a magnetic sensor;

a first magnetic field generator spaced from and opposed to the magnetic sensor in a first-axis direction, including a first multipolar magnet and generating a first magnetic field to be exerted on the magnetic sensor, the first multipolar magnet including a plurality of N poles and a plurality of S poles, the N and S poles being adjacent to each other along a plane orthogonal to the first-axis direction;

a second magnetic field generator generating a second magnetic field; and a lens, in which the first magnetic field generator and the lens are relatively movable with respect to the magnetic sensor and the second magnetic field generator along a second-axis direction orthogonal to the first-axis direction, and a center position of the magnetic sensor in a third-axis direction orthogonal to both of the first-axis direction and the second-axis direction is different from a position in the third-axis direction of an interface between the N and S poles adjacent to each other in the third-axis direction.

(19)

The lens module according to (18), further including:

a first holding member holding the first magnetic field generator and the lens; and a second holding member holding the second magnetic field generator and the magnetic sensor, in which the first holding member is movable along the second-axis direction with respect to the second holding member.

(20)

An imaging apparatus including an imaging element, and a lens module, the lens module including:

a magnetic sensor;

a first magnetic field generator spaced from and opposed to the magnetic sensor in a first-axis direction, including a first multipolar magnet and generating a first magnetic field to be exerted on the magnetic sensor, the first multipolar magnet including a plurality of N poles and a plurality of S poles, the N and S poles being adjacent to each other along a plane orthogonal to the first-axis direction;

a second magnetic field generator generating a second magnetic field; and a lens, in which the first magnetic field generator and the lens are relatively movable with respect to the magnetic sensor and the second magnetic field generator along a second-axis direction orthogonal to the first-axis direction, and a center position of the magnetic sensor in a third-axis direction orthogonal to both of the first-axis direction and the second-axis direction is different from a position in the third-axis direction of an interface between the N and S poles adjacent to each other in the third-axis direction.

The position detection unit, the lens module, and the imaging apparatus according to at least one embodiment of the technology achieve high detection accuracy.

Although the technology has been described hereinabove in terms of the example embodiment and modification examples, it is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A position detection unit comprising:
a magnetic sensor; and
a first magnetic field generator spaced from and opposed to the magnetic sensor in a first-axis direction, including a first multipolar magnet and generating a first magnetic field to be exerted on the magnetic sensor, the first multipolar magnet including a plurality of N poles and a plurality of S poles, the N and S poles being adjacent to each other along a plane orthogonal to the first-axis direction, wherein
the magnetic sensor and the first magnetic field generator are relatively movable with respect to each other along a second-axis direction orthogonal to the first-axis direction, and
a center position of the magnetic sensor in a third-axis direction orthogonal to both of the first-axis direction and the second-axis direction is different from a position in the third-axis direction of an interface between the N and S poles adjacent to each other in the third-axis direction.

2. The position detection unit according to claim 1, wherein
the first magnetic field includes a first magnetic field component, and a second magnetic field component having a phase difference from the first magnetic field component, and
the magnetic sensor is configured to generate a detection signal corresponding to a direction of a detection-target magnetic field, and configured to detect a positional change of the first magnetic field generator, the detection-target magnetic field being a magnetic field to be detected, and being a composite of the first magnetic field component and the second magnetic field component in the plane.

3. The position detection unit according to claim 1, wherein
the first multipolar magnet includes a first N pole and a second N pole as the plurality of N poles, and a first S pole and a second S pole as the plurality of S poles,
the first N pole and the first S pole are adjacent to each other in the third-axis direction,
the second N pole and the second S pole are adjacent to each other in the third-axis direction,
the first N pole and the second S pole are adjacent to each other in the second-axis direction, and
the second N pole and the first S pole are adjacent to each other in the second-axis direction.

4. The position detection unit according to claim 1, wherein the first multipolar magnet includes
a first region part magnetized in a first direction along the third-axis direction, and
a second region part magnetized in a second direction that is along the third-axis direction and opposite to the first direction.

5. The position detection unit according to claim 4, wherein the first multipolar magnet further includes a neutral zone between the first region part and the second region part.

6. The position detection unit according to claim 5, wherein the neutral zone extends along the third-axis direction.

7. The position detection unit according to claim 1, wherein the first multipolar magnet has a longitudinal direction along the second-axis direction.

8. The position detection unit according to claim 1, wherein the interface extends along the second-axis direction.

9. The position detection unit according to claim 1, wherein the magnetic sensor and the first multipolar magnet are relatively movable with respect to each other along the second-axis direction while keeping a state of overlapping each other in the first-axis direction.

10. The position detection unit according to claim 1, further comprising a second magnetic field generator generating a second magnetic field, wherein
the first magnetic field generator is movable along the second-axis direction with respect to the magnetic sensor and the second magnetic field generator owing to the second magnetic field.

11. The position detection unit according to claim 10, wherein the second magnetic field generator includes a second multipolar magnet including a plurality of N poles and a plurality of S poles.

12. The position detection unit according to claim 11, wherein
the second magnetic field generator includes a pair of the second multipolar magnets, the second multipolar magnets being opposed to each other in the third-axis direction and each extending along the first-axis direction, and
the magnetic sensor is interposed between the second multipolar magnets in the third-axis direction.

13. The position detection unit according to claim 10, further comprising a first holding member holding the first magnetic field generator, wherein
the first holding member is movable in the second-axis direction owing to the second magnetic field.

14. The position detection unit according to claim 13, wherein the first holding member is configured to hold a lens having an optical axis along the second-axis direction.

15. The position detection unit according to claim 10, further comprising a second holding member holding the magnetic sensor and the second magnetic field generator.

16. The position detection unit according to claim 1, wherein the magnetic sensor is configured to detect each of an intensity of a first magnetic field component along the second-axis direction and an intensity of a second magnetic field component along the third-axis direction.

17. The position detection unit according to claim 1, wherein the magnetic sensor is configured to detect a direction of a composite magnetic field, the composite magnetic field being a composite of a first magnetic field component along the second-axis direction and a second magnetic field component along the third-axis direction.

18. A lens module comprising:
a magnetic sensor;
a first magnetic field generator spaced from and opposed to the magnetic sensor in a first-axis direction, including a first multipolar magnet and generating a first magnetic field to be exerted on the magnetic sensor, the first multipolar magnet including a plurality of N poles and a plurality of S poles, the N and S poles being adjacent to each other along a plane orthogonal to the first-axis direction;

a second magnetic field generator generating a second magnetic field; and a lens, wherein the first magnetic field generator and the lens are relatively movable with respect to the magnetic sensor and the second magnetic field generator along a second-axis direction orthogonal to the first-axis direction, and a center position of the magnetic sensor in a third-axis direction orthogonal to both of the first-axis direction and the second-axis direction is different from a position in the third-axis direction of an interface between the N and S poles adjacent to each other in the third-axis direction.

19. The lens module according to claim 18, further comprising:

a first holding member holding the first magnetic field generator and the lens; and a second holding member holding the second magnetic field generator and the magnetic sensor, wherein the first holding member is movable along the second-axis direction with respect to the second holding member.

20. An imaging apparatus including
an imaging element, and
a lens module,
the lens module comprising:

a magnetic sensor;

a first magnetic field generator spaced from and opposed to the magnetic sensor in a first-axis direction, including a first multipolar magnet and generating a first magnetic field to be exerted on the magnetic sensor, the first multipolar magnet including a plurality of N poles and a plurality of S poles, the N and S poles being adjacent to each other along a plane orthogonal to the first-axis direction;

a second magnetic field generator generating a second magnetic field; and a lens, wherein the first magnetic field generator and the lens are relatively movable with respect to the magnetic sensor and the second magnetic field generator along a second-axis direction orthogonal to the first-axis direction, and a center position of the magnetic sensor in a third-axis direction orthogonal to both of the first-axis direction and the second-axis direction is different from a position in the third-axis direction of an interface between the N and S poles adjacent to each other in the third-axis direction.

* * * * *